(12) United States Patent
Seyoum et al.

(10) Patent No.: US 11,285,708 B2
(45) Date of Patent: Mar. 29, 2022

(54) FORGERY PREVENTION LABELS FOR HIGH-TEMPERATURE APPLICATIONS

(71) Applicants: Röhm GmbH, Darmstadt (DE); Roehm America LLC, Parsippany, NJ (US)

(72) Inventors: Ghirmay Seyoum, Egelsbach (DE); Markus Parusel, Messel (DE); Kim Struwe, Frankfurt am Main (DE); Anderson Costa, Gulf Breeze, FL (US); Claude Guénanten, Darmstadt (DE); Helmut Häring, Otzberg (DE)

(73) Assignees: Röhm GmbH, Darmstadt (DE); Roehm America LLC, Parisppany, NJ (US)

( * ) Notice: Subject to any disclaimer, the term of this patent is extended or adjusted under 35 U.S.C. 154(b) by 0 days.

(21) Appl. No.: 17/434,137

(22) PCT Filed: Feb. 7, 2020

(86) PCT No.: PCT/EP2020/053181
§ 371 (c)(1),
(2) Date: Aug. 26, 2021

(87) PCT Pub. No.: WO2020/173686
PCT Pub. Date: Sep. 3, 2020

(65) Prior Publication Data
US 2022/0040963 A1 Feb. 10, 2022

(30) Foreign Application Priority Data

Feb. 27, 2019 (EP) ..................................... 19159619

(51) Int. Cl.
| | |
|---|---|
| *B32B 27/08* | (2006.01) |
| *C08K 3/01* | (2018.01) |
| *B32B 27/28* | (2006.01) |
| *B32B 27/20* | (2006.01) |
| *B32B 37/26* | (2006.01) |
| *B32B 37/12* | (2006.01) |
| *B32B 37/15* | (2006.01) |
| *B32B 38/00* | (2006.01) |
| *C08J 5/18* | (2006.01) |
| *C08K 3/013* | (2018.01) |

(52) U.S. Cl.
CPC .............. *B32B 27/08* (2013.01); *B32B 27/20* (2013.01); *B32B 27/281* (2013.01); *B32B 37/12* (2013.01); *B32B 37/153* (2013.01); *B32B 37/26* (2013.01); *B32B 38/0004* (2013.01); *C08J 5/18* (2013.01); *C08K 3/013* (2018.01); *B32B 2037/268* (2013.01); *B32B 2307/5825* (2013.01); *B32B 2307/718* (2013.01); *B32B 2307/732* (2013.01); *B32B 2519/00* (2013.01); *C08J 2333/12* (2013.01); *C08J 2333/26* (2013.01)

(58) Field of Classification Search
CPC ....... B32B 27/08; B32B 27/281; B32B 27/20; B32B 37/26; B32B 37/12; B32B 37/153; B32B 38/004; B32B 2307/718; B32B 2307/5827; B32B 2307/732; B32B 2519/00; B32B 2037/268; C08K 3/013; C08J 5/18; C08J 2333/26; C08J 2333/12
USPC ....................................................... 428/477.7
See application file for complete search history.

(56) References Cited

U.S. PATENT DOCUMENTS

| | | | |
|---|---|---|---|
| 5,284,917 A | * 2/1994 | Yamamoto | C08G 18/4063 525/111 |
| 5,710,216 A | * 1/1998 | Weber | C08L 33/24 525/132 |
| 6,280,835 B1 | 8/2001 | Matsui | |
| 10,611,130 B2 | * 4/2020 | Guenanten | C08L 27/12 |
| 10,629,098 B2 | 4/2020 | Seyoum et al. | |
| 2012/0049121 A1 | * 3/2012 | Wu | C08L 81/06 252/500 |
| 2016/0159995 A1 | 6/2016 | Nakashima et al. | |
| 2018/0037776 A1 | 2/2018 | Seyoum et al. | |
| 2020/0223205 A1 | * 7/2020 | Yambe | B29C 48/21 |
| 2021/0032502 A1 | 2/2021 | Seyoum et al. | |

FOREIGN PATENT DOCUMENTS

| | | |
|---|---|---|
| EP | 3 205 323 | 7/2019 |
| JP | 59-25836 | 2/1984 |
| WO | 2016/156137 | 10/2016 |
| WO | 2018/042952 | 3/2018 |
| WO | WO-2018042952 A1 * | 3/2018 ........... B32B 27/306 |
| WO | 2019/042831 | 3/2019 |

OTHER PUBLICATIONS

XP002793366, Database WPI, week 198412, 1984, Thomson Scientific, London, GB; AN 1984-071654, 2 pages.
Decision to grant European Patent dated Mar. 25, 2021, in European Application No. 19159619.6, 3 pages.
Extended European Search Report dated Aug. 19, 2019, in European Application No. 19159619.6, 3 pages.
International Search Report dated Apr. 7, 2020 in PCT/EP2020/053181, 4 pages.
Written Opinion dated Apr. 7, 2020 in PCT/EP2020/053181, 7 pages.
U.S. Appl. No. 16/636,765, filed Feb. 5, 2020, 2021/0032502, Seyoum et al.

* cited by examiner

*Primary Examiner* — Michael M. Bernshteyn
(74) *Attorney, Agent, or Firm* — Grüneberg and Myers PLLC

(57) ABSTRACT

Heat resistant brittle films can be made from impact-modified poly(meth)acrylimide, and forgery prevention labels can contain the heat resistant brittle films. The films can be advantageously prepared by extrusion and, depending on the desired purpose, can be designed to be transparent, translucent, or entirely non-transparent, e.g., white. Ideally, the brittle films and the forgery prevention labels containing the brittle films have no intended break points such as slits, perforation, etc.

27 Claims, 2 Drawing Sheets

FORGERY PREVENTION LABELS FOR HIGH-TEMPERATURE APPLICATIONS

CROSS-REFERENCE TO RELATED APPLICATIONS

This application is the National Stage entry under § 371 of International Application No. PCT/EP2020/053181, filed on Feb. 7, 2020, and which claims the benefit of European Application No. 19159619.6, filed on Feb. 27, 2019. The content of each of these applications is hereby incorporated by reference in its entirety.

BACKGROUND OF THE INVENTION

Field of the Invention

The present invention relates to poly(meth)acrylimide films for use in forgery prevention labels for high-temperature applications as well as to forgery prevention labels comprising these films. The films can be advantageously prepared by extrusion and, depending on the intended purpose, can be designed to be transparent, translucent or entirely non-transparent e.g. white. Ideally, poly(meth) acrylimide films and forgery prevention labels comprising these films have no intended break points such as slits, perforation etc.

The forgery prevention labels of the present invention have an excellent chemical resistance, high temperature resistance and a high weathering stability. In particular, the labels show an excellent chemical resistance in the presence of a variety of chemicals commonly used in the automotive area. For these reasons, the forgery prevention labels of the present invention can be advantageously used in application where increased temperatures of more than 100° C. may occur without showing any signs of shrinkage in any dimension. Such applications include inter alia electronic product identification labels, labels for electronic modules such as chips, electric engines and light emitting devices, which are operated at increased temperatures, various automotive under-the-hood labels, road tax badges, document seals, labels for product theft prevention etc.

Description of Related Art

Forgery prevention labels, also known as security labels or anti-counterfeiting labels, are gaining increasing importance in fight against counterfeit goods. Typically, their bonding strength to a labelled substrate is high in comparison with the strength (flexural strength or tear strength) of the label itself. Therefore, ideally, such labels cannot be peeled off from the labelled article without destroying the label.

Forgery prevention labels which cannot be removed without being destroyed are also used in diverse areas of application such as securement of documents, such as of chip cards, passports, road tax badges, labels for securing products against theft, or price tags. A typical prior-art chip card consists of up to 12 individual parts, which are assembled and programmed in up to 30 separate process steps. In such operations, the support layer, the layer having a magnetic strip, and separate laminate are applied for each function. Typically, one or more layers are needed to realize adequate protection from weathering, protection against scratching, and UV protection. In a further layer, a security layer which cannot be removed without being destroyed is applied to achieve anti-counterfeit security. Finally, the printing is often found on a separate outer layer, since the other above-mentioned layers are difficult to print.

Labels of the prior art for high-temperature applications generally comprise an optionally printable support layer made of PET, PVC, PE or BOPP. A second layer laminated onto this layer using a pressure-sensitive adhesive on one facing side, is needed for stabilization with respect to weathering. This second layer is generally composed of polycarbonates, PET or PVC. Since layers of this kind must possess a limited brittleness, not least for the sake of an improved processing, these labels have to be additionally structured, by means of incisions or perforations, to ensure that they cannot be removed without being destroyed. Unfortunately, the above materials tend to show signs of an undesired shrinkage at extended temperatures for some time. In particular, extruded films often suffer from a significant shrinkage in the machine-direction i.e. direction of the extrusion. This behaviour is particularly disadvantageous if the labels carry any machine-readable signs such as barcodes, because shrinkage may render then non-readable.

Forgery prevention labels made of substantially neat PVC films are also known, especially in form of white films. These films have a desirably low initial tear strength. Unfortunately, however, the PVC films have a relatively high resistance to tear propagation. This means that the PVC film may, under certain circumstances, be peeled off from the labelled substrate by a non-authorised person with only a minor, hardly noticeable tearing. Additionally, PVC film have only a limited thermal stability.

Since forgery prevention labels are highly brittle, their manufacturing and handling on an industrial scale is significantly more difficult than manufacturing and handling of common self-adhesive labels. For instance, if a film, for instance an acrylic film for use in forgery prevention labels is manufactured by extrusion, handling and use of such film becomes problematic, since it can easily become broken or torn apart.

To overcome this problem, U.S. Pat. No. 6,280,835 suggests preparing brittle acrylic films by coating a polyethylene terephthalate foil used as a support with a liquid mixture which is obtained by dissolving a thermoplastic acrylic resin in a suitable solvent and mixing it with an inorganic filler. Thus, the extrusion step is avoided and the polyethylene terephthalate film provides the resulting multi-layer material with an adequate mechanical stability. Additionally, the solvent residues in the resulting film act as plasticisers, thereby rendering the film more flexible. However, such films have only a limited thermal and chemical stability.

A further common technical problem arises from the fact that labels are typically manufactured from a label stock that comprises a face layer (facestock), an adhesive, e.g. a pressure-sensitive adhesive (PSA) layer adhered to the face layer, optionally, a release coating layer, and a support layer removably adhered to the adhesive layer or to the release coating layer. The label stock is generally provided in form of a roll. Individual labels are usually produced by die cutting (kiss cutting) the face layer and the PSA layer, and then removing the surrounding waste matrix, leaving the individual labels adhered to the release liner. Since the material of the face layer is highly brittle, removal of the waste matrix becomes highly problematic since it can easily break or tear apart.

Typical manufacturing processes for labels are run at speeds of at least 25 m/min or even higher. As the speed increases, the process becomes less stable and risk that the waste matrix breaks or tears apart upon removal increases. Slowing the process down or increasing the web width of the waste matrix to allow a better removal of the waste matrix, however, would result in a significant cost disadvantage, loss of efficiency, and may frequently be ineffective.

WO 2016/156137 A1 describes forgery prevention labels having a high transparency and comprising poly(meth)acrylate films. These labels have a good weathering stability and are suitable for use in documents such as passports, forgery prevention labels, road tax badges, price tags etc. The inventors report that poly(meth)acrylate films perform best when they comprise not more than 10 wt.-% of an impact modifier. Unfortunately, our subsequent studies showed that in some cases, in particular in the presence of considerable amount of inorganic fillers, such a low content of impact modifiers may become problematic during manufacturing of the labels, if the process for the manufacturing of such labels involves a kiss cutting (die cutting) step. Under these circumstances, the waste matrix can sometimes break or tear apart upon removal if the process is run at a high speed. Additionally, such films often have only a limited thermal and chemical stability.

In principle, the problems associated with breaking or tearing apart of the waste matrix could be at least partially mitigated by increasing the distances between individual labels i.e. web width of the waste matrix. However, this would inevitably increase the amount of waste generated during the label manufacturing and diminish the process efficiency. Hence, such approach would not be feasible from economic and environmental points of view.

Post-published document WO 2019/042831 A1 teaches brittle acrylic films made from impact-modified polyalkyl (meth)acrylate and forgery prevention labels comprising the same. The films can be advantageously prepared by extrusion and, depending on the desired purpose, can be designed to be translucent or entirely non-transparent e.g. white. Ideally, the brittle acrylic films and the forgery prevention labels comprising the same have no intended break points such as slits, perforation etc.

EP 3 508 323 A1 describes a multilayer film, comprising a first acrylic resin layer (α1) an aromatic polycarbonate resin layer (β) and a second acrylic resin layer (α2). The acrylic resins constituting the (α1) layer and the (α2) layer may include inter alia a poly(meth)acrylimide resin.

U.S. Pat. No. 5,710,216 A teaches films made of a thermoplastic moulding material containing
  a) from 1 to 98.5% by weight of a partly aromatic copolyamide,
  b) from 1 to 98.5% by weight of a polymethacrylimide,
  c) from 0.5 to 30% by weight of a polycondensate of aliphatic or aromatic polyhydric alcohols with epihalohydrins.

JP S59-025836 A describes a thermoplastic resin composition comprising
  (a) 5 to 95 pts. wt. polyamide and
  (b) 95 to 5 pts. wt. polyglutarimide.

SUMMARY OF THE INVENTION

Problem

In light of the prior art, the problem addressed by the present invention was provision of a brittle film for use in forgery prevention labels with increased chemical resistance for high-temperature applications. In particular it was desired that such film is usable in a cost-effective manufacturing process in which individual labels are produced by kiss cutting the face layer and the PSA layer and the surrounding waste matrix is subsequently removed, leaving the individual labels adhered to the support layer. In contrast to existing extruded acrylic films the desired film should show substantially no signs of shrinkage at increased temperatures.

More particularly, the problem addressed by the present invention was provision of a brittle heat resistant film for the manufacturing of forgery prevention labels which possess a low initial tear strength, a low tear propagation resistance and a short tear path to facilitate a complete rupture of the film during an attempt of its non-authorised removal but, nevertheless, can be produced and processed without tearing.

In its further aspect, the present invention addressed the problem of providing self-adhesive heat resistant forgery prevention labels which can be manufactured in a highly efficient manner, are printable and suitable for a long-term outdoor use.

Finally, the present invention addressed the problem of developing a safe and a cost-efficient process for the manufacturing the brittle heat resistant film described above and the self-adhesive forgery prevention labels comprising the same.

Solution

The present invention is based on a surprising finding that impact-modified poly(meth)acrylimides, optionally in the presence of polyalkyl(meth)acrylate, can be advantageously used for the manufacturing of brittle heat resistant films with the desired properties. Depending on intended applications, corresponding films may be designed to be transparent, opaque or substantially non-transparent, e.g. white. In particular, the inventors surprisingly found that the films show a suitable behaviour during a die cutting (kiss cutting) process, followed by stripping of the waste matrix. Therefore, heat-resistant forgery preventing labels comprising the film of the present invention can be advantageously manufactured upon employing a step in which individual labels are produced by kiss cutting, and the surrounding waste matrix is subsequently removed, leaving the individual labels adhered to the release liner. No undesired breaking of the waste matrix takes place, even at running speeds of at least 25 m/min or even higher.

In contrast to polyalkyl(meth)acrylate of the prior art, the poly(meth)acrylimide film of the present invention typically comprises less than 5.0 wt.-%, more preferably less than 2.0 wt.-%, even more preferably less than 1.0 wt.-%, particularly less than 1.0 wt.-% of aromatic or aliphatic polyamides, based on the weight of the poly(meth)acrylimide film.

As will be readily appreciated by a skilled person, the composition of film of the present invention specified in the following is the composition of a moulding composition from which at least one layer of the film is made.

One aspect of the present invention relates to a poly(meth)acrylimide film for use in a forgery prevention label, wherein the poly(meth)acrylimide film comprises:
  from 30.0 wt.-% to 98.0 wt.-% of a poly(meth)acrylimide;
  from 2.0 wt.-% to 50.0 wt.-% of one or several impact modifiers;
  from 0.0 wt.-% to 30.0 wt.-% of a polyalkyl(meth)acrylate;
  from 0.0 wt.-% to 40.0 wt.-% of one or several inorganic fillers;
  from 0.0 wt.-% to 5.0 wt.-% of one or several UV-absorbers; and from 0.0 wt.-% to 5.0 wt.-% of one or several UV-stabilizers, based on the weight of the poly(meth)acrylimide film;

wherein the poly(meth)acrylimide comprises at least 50 wt.-%, preferably at least 60 wt.-%, most preferably at least 70 wt.-%, based on the weight of the poly(meth)acrylimide, of repeating units of Formula (I)

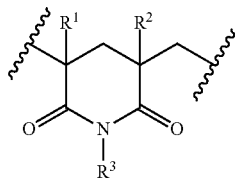

(I)

in which $R^1$ and $R^2$ are independently selected from hydrogen and a methyl group, $R^1$ and $R^2$ being preferably represented by a methyl group, and $R^3$ is hydrogen or a $C_1$-$C_4$-alkyl group, preferably a methyl group; and the cumulative content of the poly(meth)acrylimide, polyalkyl(meth)acrylate and the impact modifier is from 75.0 wt.-% to 100.0 wt.-%, preferably 85.0 wt.-% to 100.0 wt.-%, more preferably 95.0 wt.-% to 100.0 wt.-%, based on the weight of the poly(meth)acrylimide film.

A further aspect of the present invention relates to a poly(meth)acrylimide film for use in a forgery prevention label, wherein the poly(meth)acrylimide film comprises:

from 30.0 wt.-% to 92.5 wt.-% of a poly(meth)acrylimide;
from 2.5 wt.-% to 40.0 wt.-% of one or several impact modifiers;
from 0.0 wt.-% to 30.0 wt.-% of a polyalkyl(meth)acrylate;
from 5.0 wt.-% to 40.0 wt.-% of one or several inorganic fillers;
from 0.0 wt.-% to 5.0 wt.-% of one or several UV-absorbers; and
from 0.0 wt.-% to 5.0 wt.-% of one or several UV-stabilizers, based on the weight of the poly(meth)acrylimide film;

wherein the poly(meth)acrylimide comprises at least 50 wt.-%, preferably at least 60 wt.-%, most preferably at least 70 wt.-%, based on the weight of the poly(meth)acrylimide, of repeating units of Formula (I)

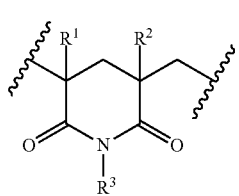

(I)

in which $R^1$ and $R^2$ are independently selected from hydrogen and a methyl group, $R^1$ and $R^2$ being preferably represented by a methyl group, and $R^3$ is hydrogen or a $C_1$-$C_4$-alkyl group, preferably a methyl group; and wherein the cumulative content of the poly(meth)acrylimide, polyalkyl(meth)acrylate and the impact modifier is from 60.0 wt.-% to 95.0 wt.-%, preferably from 70.0 wt.-% to 95.0 wt.-%, even more preferably from 80.0 wt.-% to 95.0 wt.-%, based on the weight of the poly(meth)acrylimide film; and the content, in wt.-%, of one or several impact modifiers $n_{im}$ in the poly(meth)acrylimide film is described by the following relationship:

$$0.5 * n_f \leq n_{im} \leq 1.8 * n_f$$

$n_f$ being the content, in wt.-%, of one or several inorganic fillers in the poly(meth)acrylimide film.

A further aspect of the present invention relates to a forgery prevention label comprising a poly(meth)acrylimide film as described above.

Yet a further aspect of the present invention relates to a laminate for the manufacturing of said forgery prevention label, the laminate comprising at least the following layers:
a) a liner layer preferably having initial tear resistance of from 50 N to 500 N, measured according to ASTM D1004 (2013) with a foil having a thickness of 50.0 μm; and
b) a layer consisting of the poly(meth)acrylimide film.

Still a further aspect of the present invention relates to a process for the manufacturing of the laminate, the process comprising at least the following steps i) and ii):
i) preparation of said poly(meth)acrylimide film using an extruder, wherein the poly(meth)acrylimide film is obtained; and
ii) binding a liner layer to the poly(meth)acrylimide film from the step i) downstream of the extruder.

Still a further aspect of the present invention relates to a process for the manufacturing of the forgery prevention label, the process comprising at least the following steps i) to iv):
i) preparation of the poly(meth)acrylimide film using an extruder;
ii) binding a liner layer to the poly(meth)acrylimide film from the step i) downstream of the extruder, wherein a laminate is obtained;
iii) binding an adhesive layer, optionally, a release coating layer and a support layer onto the laminate from step ii), wherein a label stock is obtained; and
iv) kiss cutting the label stock obtained in the step iii) and removing the resulting waste matrix, wherein a plurality of individual self-adhesive forgery prevention labels on a support layer is obtained.

Finally, the present invention relates to use of the forgery prevention label for the manufacturing of chip cards, documents, forgery prevention labels, electronic product identification labels, automotive under-the-hood labels, document seals or price tags.

DETAILED DESCRIPTION OF THE INVENTION

Figure 1:
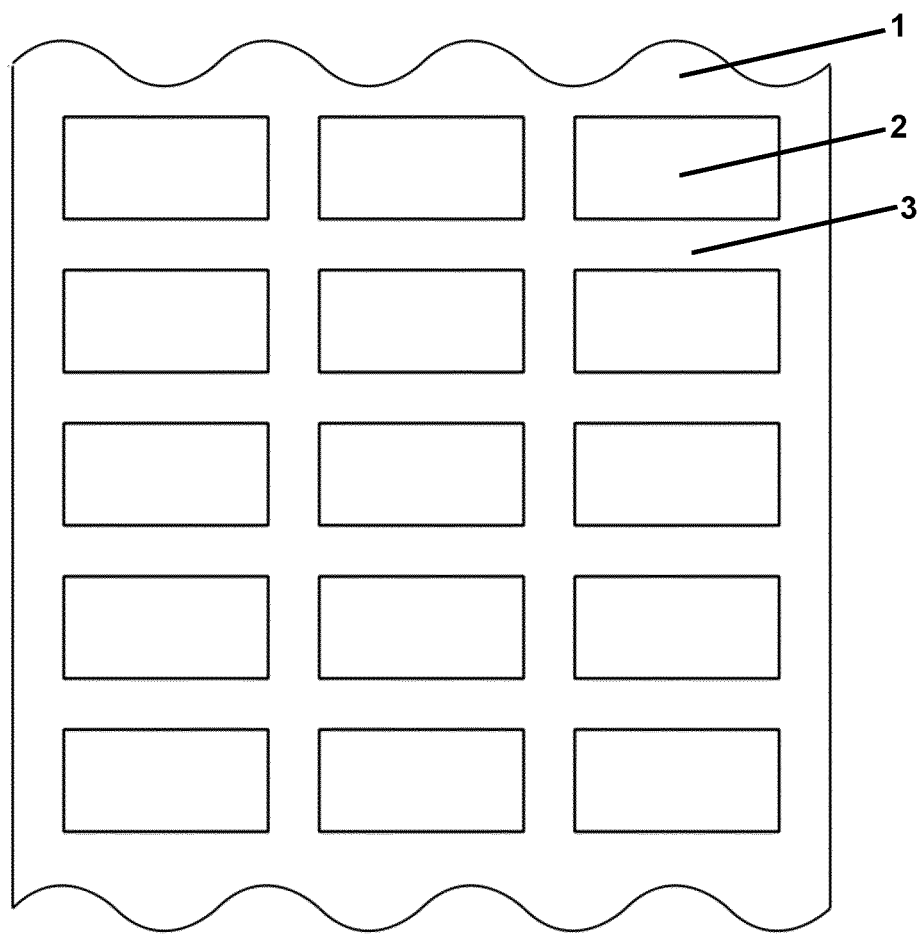
FIG. 1 schematic representation of an endless label stock 1 after a kiss cutting process. In a subsequent process step the waste matrix 3 is removed from the support layer thereby leaving a plurality of individual forgery prevention labels 2 attached to the support layer.

The poly(meth)acrylimide film of the present invention has the following composition:
from 30.0 wt.-% to 98.0 wt.-% of a poly(meth)acrylimide;
from 2.0 wt.-% to 50.0 wt.-% of one or several impact modifiers;
from 0.0 wt.-% to 30.0 wt.-% of a polyalkyl(meth)acrylate;
from 0.0 wt.-% to 40.0 wt.-% of one or several inorganic fillers;
from 0.0 wt.-% to 5.0 wt.-% of one or several UV-absorbers; and
from 0.0 wt.-% to 5.0 wt.-% of one or several UV-stabilizers, based on the weight of the poly(meth)acrylimide film.

The poly(meth)acrylimide comprises at least 50 wt.-%, preferably at least 60 wt.-%, most preferably at least 70 wt.-%, based on the weight of the poly(meth)acrylimide, of repeating units of Formula (I)

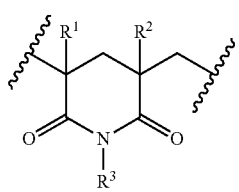

in which $R^1$ and $R^2$ are independently selected from hydrogen and a methyl group, $R^1$ and $R^2$ being preferably represented by a methyl group, and $R^3$ is hydrogen or a $C_1$-$C_4$-alkyl group, preferably a methyl group.

The cumulative content of the poly(meth)acrylimide, polyalkyl(meth)acrylate and the impact modifier is from 75.0 wt.-% to 100.0 wt.-%, preferably 85.0 wt.-% to 100.0 wt.-%, more preferably 95.0 wt.-% to 100.0 wt.-%, based on the weight of the poly(meth)acrylimide film.

As will be readily appreciated by a skilled person, the amounts of
a poly(meth)acrylimide;
one or several impact modifiers;
polyalkyl(meth)acrylate
one or several inorganic fillers;
one or several UV-absorbers; and
one or several UV-stabilizers, based on the weight of the poly(meth)acrylimide film
sum up to 100 wt.-% in total.

The film of the present invention can be designed to be substantially transparent, if required. As used herein, the term "substantially transparent" refers to a material having a transmittance (D65) of at least 50%, preferably at least 60%, more preferably at least 70%, even more preferably at least 80% and particularly preferably at least 90%, determined on a sample having a thickness of 50.0 μm according to the norm ISO 13468-2 (2006).

In a further important embodiment of the present invention the brittle heat resistant film is substantially non-transparent and comprise at least one inorganic filler. Upon investigating such films, the inventors surprisingly found that their behaviour during die cutting (kiss cutting) process, followed by stripping of the waste matrix, strongly depends on the ratio between the impact modifier amount and the amount of the inorganic filler in the film. In particular, the inventors found that poly(meth)acrylimide films, in which the total content of one or several impact modifiers $n_{im}$, expressed in wt.-% based on the total weight of the film, is described by the following relationship:

$$0.5*n_f \leq n_{im} \leq 1.8*n_f$$

$n_f$ being the total content of one or several inorganic fillers, expressed in wt.-% based on the total weight of the film, is particularly suitable for processing by a kiss cut process. Therefore, forgery preventing labels comprising the film of the present invention can be advantageously manufactured upon employing a step in which individual labels are produced by kiss cutting, and the surrounding waste matrix is subsequently removed, leaving the individual labels adhered to the release liner. No undesired breaking of the waste matrix takes place, even at running speeds of at least 25 m/min or even higher.

In the present application, the content of one or several impact modifiers $n_{im}$ is the content of neat impact modifiers. In case of particulate impact modifiers $n_{im}$ is the content of neat impact modifier particles. Hence, if the corresponding impact modifiers are rubbery particles, $n_{im}$ is the content of the rubbery particles in the poly(meth)acrylimide film. If the corresponding impact modifiers are core-shell, core-shell-shell or core-shell-shell-shell particles, $n_{im}$ is the content of the entire particles in the poly(meth)acrylimide film.

Hence, one embodiment of the present invention relates to a poly(meth)acrylimide film comprising:
from 30.0 wt.-% to 92.5 wt.-% of a poly(meth)acrylimide;
from 2.5 wt.-% to 40.0 wt.-% of one or several impact modifiers;
from 0.0 wt.-% to 30.0 wt.-% of a polyalkyl(meth)acrylate;
from 5.0 wt.-% to 40.0 wt.-% of one or several inorganic fillers;
from 0.0 wt.-% to 5.0 wt.-% of one or several UV-absorbers; and
from 0.0 wt.-% to 5.0 wt.-% of one or several UV-stabilizers, based on the weight of the poly(meth)acrylimide film;

wherein the cumulative content of the poly(meth)acrylimide, polyalkyl(meth)acrylate and the impact modifier is from 75.0 wt.-% to 95.0 wt.-%, preferably 85.0 wt.-% to 100.0 wt.-%, more preferably 95.0 wt.-% to 100.0 wt.-%, based on the weight of the poly(meth)acrylimide film; and the content, in wt.-%, of one or several impact modifiers $n_{im}$ in the poly(meth)acrylimide film is described by the following relationship:

$$0.5*n_f \leq n_{im} \leq 1.8*n_f$$

preferably $0.55*n_f \leq n_{im} \leq 1.6*n_f$ more preferably $0.6*n_f \leq n_{im} \leq 1.5*n_f$ $n_f$ being the content, in wt.-%, of one or several inorganic fillers in the poly(meth)acrylimide film.

Furthermore, the inventors found that the balance between suitability to a manufacturing process employing a kiss cut step, followed by a subsequent waste matrix removal, on one hand, and ability to resist a non-authorised attempt to peel off the forgery prevention label from the intended substrate, on the other hand, is particularly advantageous when the poly(meth)acrylimide film comprises:
from 40.0 wt.-% to 80.0 wt.-% of a poly(meth)acrylimide;
from 4.0 wt.-% to 35.0 wt.-% of one or several impact modifiers;

from 0.0 wt.-% to 25.0 wt.-% of a polyalkyl(meth) acrylate;
from 8.0 wt.-% to 35.0 wt.-% of one or several inorganic fillers;
from 0.0 wt.-% to 5.0 wt.-% of one or several UV-absorbers; and
from 0.0 wt.-% to 5.0 wt.-% of one or several UV-stabilizers, based on the weight of the poly(meth)acrylimide film;
wherein the cumulative content of the poly(meth)acrylimide, polyalkyl(meth)acrylate and the impact modifier is from 65.0 wt.-% to 92.0 wt.-%, based on the weight of the poly(meth)acrylimide film; and the content, in wt.-%, of one or several impact modifiers $n_{im}$ in the poly(meth)acrylimide film is described by the following relationship:

$$0.5*n_f \leq n_{im} \leq 1.8*n_f$$

preferably $0.55*n_f \leq n_{im} \leq 1.6*n_f$ more preferably $0.6*n_f \leq n_{im} \leq 1.5*n_f$ $n_f$ being the content, in wt.-%, of one or several inorganic fillers in the poly(meth)acrylimide film.

Furthermore, the inventors found that overall properties of the poly(meth)acrylimide film can be improved even further when the poly(meth)acrylimide film comprises:
from 45.0 wt.-% to 75.0 wt.-% of a poly(meth)acrylimide;
from 6.0 wt.-% to 30.0 wt.-% of one or several impact modifiers;
from 0.0 wt.-% to 20.0 wt.-% of a polyalkyl(meth) acrylate;
from 10.0 wt.-% to 30.0 wt.-% of one or several inorganic fillers;
from 0.0 wt.-% to 5.0 wt.-% of one or several UV-absorbers; and
from 0.0 wt.-% to 5.0 wt.-% of one or several UV-stabilizers, based on the weight of the poly(meth)acrylimide film;
wherein the cumulative content of the poly(meth)acrylimide, polyalkyl(meth)acrylate and the impact modifier is from 70.0 wt.-% to 90.0 wt.-%, based on the weight of the poly(meth)acrylimide film; and the content, in wt.-%, of one or several impact modifiers $n_{im}$ in the poly(meth)acrylimide film is described by the following relationship:

$$0.5*n_f \leq n_{im} \leq 1.8*n_f$$

preferably $0.55*n_f \leq n_{im} \leq 1.6*n_f$ more preferably $0.6*n_f \leq n_{im} \leq 1.5*n_f$ $n_f$ being the content, in wt.-%, of one or several inorganic fillers in the poly(meth)acrylimide film.

Poly(Meth)Acrylimide Film

Typically, the poly(meth)acrylimide film of the present invention consists of one single layer i.e. is a monolayer film. Such films can be manufactured by methods known to a skilled person such as solution coating, casting or extrusion, wherein extrusion is particularly preferred in terms of high productivity and advantageous properties of the resulting film. Surprisingly, despite the poly(meth)acrylimide film of the present invention is highly brittle, the film can be conveniently manufactured by extrusion and e.g. subsequently stored for shipping to a customer or used immediately for the manufacturing of forgery prevention labels.

To serve the desired purpose in an optimal way, the poly(meth)acrylimide film of the present invention preferably has tensile stress of from 20.0 MPa to 70.0 MPa, measured according to DIN EN ISO 527-3/2/100 (2003) with a foil having a thickness of 50.0 μm. Although the film having a tensile stress lower than 20.0 MPa still would be suitable for use according to the present invention, a great attention would need to be taken during its manufacturing and handling, since the film can easily tear apart.

On the other hand, although the poly(meth)acrylimide film of the present invention having tensile stress of more than 70.0 MPa is highly suitable for the manufacturing process of forgery prevention labels, use of such labels could bear an increased risk that such label can be removed using a thin sharp blade (e.g. a razor blade) from the originally labelled substrate and subsequently re-attached onto a different substrate.

From the standpoint of having a good balance between the handling and brittleness of the film, the initial tear resistance is preferably in the range of from 1.0 N to 15.0 N. The tensile stress of the poly(meth)acrylimide film can be determined by a common method known to a skilled person such as the method described in the standard DIN EN ISO 527-3/2/100 (2003) and is typically measured in the direction of extrusion.

Preferably, the poly(meth)acrylimide film has resistance to tear propagation, measured according to ASTM D1938 (2014) with a foil having a thickness of 50.0 μm, of from 0.01 N/mm to 1.50 N/mm, preferably from 0.1 N/mm to 1.20 N/mm. The resistance to tear propagation is typically measured in the direction of extrusion.

Furthermore, to ensure an optimal balance between processability of the poly(meth)acrylimide film and the ability of the final forgery prevention labels to withstand non-authorised removal attempts, it is preferable that the poly (meth)acrylimide film has elongation at break ranging between 3.0% to 30%, measured according to DIN EN ISO 527-3/2/100 (2003) with a foil having a thickness of 50.0 μm, whereby elongation at break ranging between 8.0% to 25.0% is particularly advantageous in terms of handling.

If the elongation at break is less than 3.0%, flexibility of the film is excessively small, so that handling of the film becomes difficult and great care should be taken during manufacturing to avoid damaging the film. Under these circumstances, the manufacturing process may need to be run at a lower speed. On the other hand, when the elongation at break exceeds 30.0%, brittleness of the film tends decrease. Therefore, during an attempt to remove the forgery prevention label with a thin sharp blade a minor mechanical deformation of the film (i.e. less than 25%) may not necessarily lead to its complete rupture. This increases the risk that a skilled and experienced individual using a sufficiently thin and sharp tool may succeed in removing the forgery prevention label from the original substrate (e.g. a replaceable part for a vehicle engine) in order to re-attach it to a different object (a non-genuine replaceable part). The elongation at break of the poly(meth)acrylimide film can be measured by a common method known to a skilled person such as the one described in the standard DIN EN ISO 527-3/2/100 (2003).

According to the present invention, there are also various influencing factors which, by being varied, allow the skilled person to adjust elongation at break of the film of the present invention in the desired direction.

The major influencing factors are the amounts of impact modifiers and inorganic fillers. More particularly, an increase in concentration of the impact modifiers also increases the elongation at break, and therefore smaller amounts of impact modifiers contribute to a low elongation at break in accordance with the invention.

In one preferred embodiment, the initial tear resistance of the poly(meth)acrylimide film is at least 10 times as high, preferably at least 50 times as high, even more preferably at least 100 times as high as resistance to tear propagation. This is particularly advantageous and ensures that even a minor film rupture occurring during an unauthorised attempt to remove the forgery prevention label from a substrate rapidly propagates through the entire label and results in a complete label destruction. This additionally reduces the risk of an unauthorised label removal.

Advantageously, the dimensional stability of an extruded film of the present invention at 120° C. (30 minutes) is not higher than 0.7%, preferably not higher than 0.5% in the machine direction orientation (direction of extrusion) and not higher than 0.5%, preferably not higher than 0.3% in the transverse direction (direction perpendicular to the machine direction). If the film of the present invention is manufactured by a method other than extrusion, its dimensional stability is not higher than 0.5%, preferably not higher than 0.3%.

The dimensional stability can be measured according to the norm DIN EN ISO 11501 (2004) using a film having a thickness of 50.0 μm. The measurements can be carried out at 120° C. over a period of 30 minutes.

Furthermore, the film of the present invention has an excellent chemical resistance in the presence of common chemicals such as disinfectants, detergents and various fluids commonly used in road vehicles such as hydraulic fluid, brake fluid, engine oil etc. For this reason, the films are highly suitable for use as automotive under-the-hood labels.

The thickness of the poly(meth)acrylimide film of the present invention is preferably in the range of 15.0 μm to 120.0 μm. When the thickness is below 15.0 μm, a great care should be taken during manufacturing and handling of the film to avoid its rupture. On the other hand, when the film thickness exceeds 120.0 μm, its mechanical stability is rather high and this, again, increases the risk that the film does not break during an attempt of an unauthorised label removal. Additionally, a high film thickness will result in a high thickness of the forgery prevention label comprising the same, which may be disadvantageous for aesthetical or other reasons. From the standpoint of having a good balance between the handling and flatness, the thickness of the poly(meth)acrylimide film is preferably in the range of 30.0 μm to 90.0 μm, a range of 40.0 μm to 75.0 μm being even more preferred.

The thickness of the film of the present invention can be determined by mechanical scanning according to the norm ISO 4593 (1993). Preferably, however, the thickness of the film of the present invention is determined using photomicrographs obtained using a scanning electron microscope such as JEOL JSM-IT300 (commercially available from JEOL GmbH, Freising, Germany). For this purpose, the film samples can be frozen in liquid nitrogen, mechanically broken and the freshly obtained surfaces are analysed. For example, the measurement can be carried out using the following parameters:

Current source: variable flow of electrons from a tungsten filament (cathode)
Vacuum system: rotary pump/oil diffusion pump
X-Y-Z-rotation-tilt: totally motorized
Working distance (WD): 5 to 70 mm (common: 10 mm)
Sample rotation: 360°
Sample tilting: −5 to max. 90° (depending on WD)
Magnification: 10× to 300 000×
Maximum resolution: ~3 nm
Detectors: Secondary Electrons (SE)
Back Scattered Electrons (BSE, 5 segments)
Energy dispersive X-Ray Analysis (EDS)

Poly(Meth)Acrylimides

The poly(meth)acrylimide (PMMI) used in the present invention comprises at least 50 wt.-%, preferably at least 60 wt.-%, most preferably at least 70 wt.-%, based on the weight of the poly(meth)acrylimide, of repeating units of Formula (I):

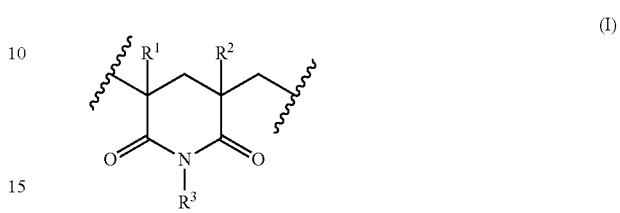

in which $R^1$ and $R^2$ are independently selected from hydrogen and a methyl group, $R^1$ and $R^2$ being preferably represented by a methyl group, and $R^3$ is hydrogen or a $C_1$-$C_4$-alkyl group, preferably a methyl group.

Preparation processes for PMMI are disclosed by way of example in EP-A 216 505, EP-A 666 161 or EP-A 776 910, the entire disclosure of which is incorporated herein by reference.

The starting material used for preparation of PMMI comprises a polymer derived from alkyl esters of methacrylic acid and generally composed of more than 50.0% by weight, preferably of more than 80.0% by weight, particularly preferably of from 95.0% by weight to 100.0% by weight, of units of alkyl esters of methacrylic acid having from 1 to 4 carbon atoms in the alkyl radical. Methyl methacrylate is preferred. Preferred polymers are composed of at least 80.0% by weight, preferably of more than 90.0% by weight, particularly preferably of more than 95.0% by weight, of methyl methacrylate. Comonomers that can be used comprise any of the monomers copolymerizable with methyl methacrylate, in particular alkyl esters of acrylic acid having from 1 to 4 carbon atoms in the alkyl radical, acrylo- or methacrylonitrile, acryl or methacrylamide, styrene, or else maleic anhydride. Preference is given to thermoplastically processable polymers of this type whose reduced viscosity is in the range from 20 ml/g to 92 ml/g, preferably from 50 ml/g to 80 ml/g (measured to ISO 8257 (2006), Part 2). They are used in the form of powder or pellets whose median particle size is from about 0.03 mm to 3 mm.

It is significant that, in a step of the process, ammonia is first used as imidating agent, and that, in a subsequent step of the process, a $C_{1-4}$-alkylamine, typically methylamine is used, and that the molar ratio of ammonia used to the methylamine used is from 1:0.5 to 1:3, preferably from 1:0.8 to 1:2.7, particularly preferably from 1:0.9 to 1:1.1. Below this range, haze can occur to an increased extent in the polymethacrylimide obtained. If there is a molar excess of methylamine, based on the ammonia used, the proportion of carboxylic acid groups in the polymer in turn rises undesirably.

The reaction with the imidating agent is preferably terminated before the polymer has been completely imidated. To this end, the total amount used of the imidating agents can, for example, be from 0.2 to 2.5 mol, preferably from 0.5 to 1.5 mol, particularly preferably from 0.8 to 1.2 mol, per underlying mol of the ester units. However, the defined quantitative ratio of ammonia to methylamine is always to be maintained. This then gives polymers which are composed of from about 20 underlying mol % to 80 underlying mol % of cyclic methacrylimide units, and which have only small amounts, less than 5.0% by weight, of methacrylic acid units.

The imidation process can be carried out substantially in a manner known per se, e.g. as described in EP 441 148. The imidation proceeds best at temperatures above the melting point or at least 20° C. above the Vicat B softening point to ISO 306 (2014) for the starting polymer. It is more preferable to select a reaction temperature which is at least 20° C. above the softening point of the resultant imidated polymer. Since the Vicat softening point of the imidated polymer is generally the target variable of the process, and the degree of imidation to be achieved is defined in accordance therewith, it is likewise readily possible to determine the required minimum temperature. A temperature range of from 140° C. to 300° C. is preferred, in particular from 150° C. to 260° C., particularly preferably from 180° C. to 220° C. Excessively high reaction temperatures sometimes lead to a reduction in viscosity caused by some extent of chain termination of the polymer. In order to prevent unnecessary thermal stressing of the polymer, the reaction temperature can, for example, be raised gradually or in stages, starting from a temperature slightly above the melting point of the starting polymer, and only at a final juncture exceed the softening point of the imidated end product by at least 20° C. Within the stages of the reaction, it is preferable to operate with autogenous pressure, which can be from 50 bar to 500 bar. Depressurization can be carried out during the stages of the process, e.g. for devolatilization. The temperature of the reaction mixture can fall here and must then be increased back to the required value. If imidating agent is introduced under reaction conditions, an appropriately high pressure must, of course, be used for this purpose.

Partial or complete imidation of polymers of alkyl esters of methacrylic acid via reaction with an imidating agent, for example with a primary amine, is disclosed by way of example in U.S. Pat. No. 2,146,209. The polymer is heated to temperatures of from 140° C. to 250° C. in the presence or absence of a solvent with the imidating agent, if appropriate under pressure.

Typically, PMMIs for use in the present invention have a mass average molar weight Mw of from 80 000 g/mol to 200 000 g/mol, preferably from 90 000 g/mol to 150 000 g/mol, determined by GPC using PMMA as a standard. Such materials are commercially available from Evonik Performance Materials GmbH (Darmstadt, Germany) under the trademark PLEXIMID®. Suitable products include but are not limited to PLEXIMID® TT50, PLEXIMID® TT70, PLEXIMID® 8805, PLEXIMID® 8813, PLEXIMID® 8817.

The film of the present invention typically comprises from 30.0 wt.-% to 98.0 wt.-%, preferably from 30.0 wt.-% to 92.5 wt.-%, more preferably from 40.0 wt.-% to 80.0 wt.-%, even more preferably from 45.0 wt.-% to 75.0 wt.-%, based on the weight of the poly(meth)acrylimide film.

Polyalkyl(Meth)Acrylates

The poly(meth)acrylimide film of the present invention may comprise from 0.0 wt.-% to 30.0 wt.-% of a polyalkyl (meth)acrylate, based on the weight of the poly(meth) acrylimide film.

Polyalkyl(meth)acrylates are usually obtained by free-radical polymerization of mixtures which typically comprise an alkyl(meth)acrylate, typically methyl methacrylate (a), and at least one further (meth)acrylate (b). These mixtures generally comprise at least 50 wt.-%, preferably at least 60 wt.-%, particularly preferably at least 80 wt.-%, and even more preferably at least 90 wt.-%, based on the weight of the monomers, of methyl methacrylate (a). The amount of methyl methacrylate (a) generally used is from 50.0 wt.-% to 99.9 wt.-%, preferably from 80.0 wt.-% to 99.0 wt.-% and particularly preferably from 90.0 wt.-% to 99.0 wt.-%, based on the weight of monomers.

These mixtures for production of polyalkyl(meth)acrylates can also comprise other (meth)acrylates (b) copolymerizable with methyl methacrylate (a). The term "(meth) acrylate" as used herein is meant to encompass methacrylates, acrylates and mixtures thereof. (Meth)acrylates may derive from saturated alcohols, e.g. methyl acrylate, ethyl (meth)acrylate, propyl (meth)acrylate, n-butyl (meth)acrylate, tert-butyl (meth)acrylate, isobutyl (meth) acrylate, pentyl (meth)acrylate and 2-ethylhexyl (meth)acrylate; or from unsaturated alcohols, e.g. allyl (meth)acrylate, vinyl (meth)acrylate; and also aryl (meth)acrylates, such as benzyl (meth)acrylate or phenyl (meth)acrylate, cycloalkyl (meth)acrylates, such as 3-vinylcyclohexyl (meth)acrylate, bornyl (meth)acrylate; hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate; glycol di(meth)acrylates, such as 1,4-butanediol (meth)acrylate; amides and nitriles of (meth) acrylic acid, e.g. N-(3-dimethylaminopropyl)(meth)acrylamide, N-(diethylphosphono)-(meth)acrylamide, 1-methacryloylamido-2-methyl-2-propanol; polyfunctional (meth) acrylates, such as trimethyloylpropane tri(meth)acrylate.

The amount of the (meth)acrylic comonomers (b) generally used is from 0.1 wt.-% to 50.0 wt.-%, preferably from 1.0 wt.-% to 20.0 wt.-% and particularly preferably from 1.0 wt.-% to 10.0 wt.-%, based on the weight of monomers, and the compounds here can be used individually or in the form of a mixture.

The polymerization reaction is generally initiated by known free-radical initiators. Among the preferred initiators are inter alia the azo initiators well known to persons skilled in the art, e.g. AIBN and 1,1-azobiscyclohexanecarbonitrile, and peroxy compounds, such as methyl ethyl ketone peroxide, acetylacetone peroxide, dilauryl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butylperoxy isopropyl carbonate, 2,5-bis(2-ethylhexanoylperoxy)-2,5-dimethylhexane, tert-butyl 2-ethylperoxyhexanoate, tert-butyl 3,5,5-trimethylperoxyhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the abovementioned compounds with one another and mixtures of the abovementioned compounds with compounds that have not been mentioned but which can likewise form free radicals.

The compositions to be polymerized can comprise not only the methyl methacrylate (a) and the (meth)acrylates (b) described above but also other unsaturated monomers which are copolymerizable with methyl methacrylate and with the abovementioned (meth)acrylates. Among these are inter alia 1-alkenes, such as 1-hexene, 1-heptene; branched alkenes, such as vinylcyclohexane, 3,3-dimethyl-1-propene, 3-methyl-1-diisobutylene, 4-methyl-1-pentene, norbornene; acrylonitrile; vinyl esters, such as vinyl acetate; styrene, substituted styrenes having an alkyl substituent in the side chain, e.g. α-methylstyrene and α-ethylstyrene, substituted styrenes having an alkyl substituent on the ring, e.g. vinyl-toluene and p-methylstyrene, halogenated styrenes, such as monochlorostyrenes, dichlorostyrenes, tribromostyrenes and tetrabromostyrenes; vinyl ethers and isoprenyl ethers;

maleic acid derivatives, such as maleic anhydride, methylmaleic anhydride, maleimide, methylmaleimide; and dienes, such as divinylbenzene.

The amount of these comonomers (c) generally used is from 0.0 wt.-% to 20.0 wt.-%, preferably from 0.0 wt.-% to 15.0 wt.-% and particularly preferably from 0.0 wt.-% to 10.0 wt.-%, based on the weight of monomers, and the compounds here can be used individually or in the form of a mixture.

Further preference is given to polyalkyl(meth)acrylates which are obtainable by polymerization of a composition having, as polymerizable constituents:
(a) from 50.0 wt.-% to 99.9 wt.-% of methyl methacrylate,
(b) from 0.1 wt.-% to 50.0 wt.-% of an acrylic acid ester of a C1-C4 alcohol,
(c) from 0.0 wt.-% to 10.0 wt.-% of monomers copolymerizable with the monomers (a) and (b).

In yet a further embodiment, preference is given to polyalkyl(meth)acrylates composed of from 85.0 wt.-% to 99.5 wt. % of methyl methacrylate and from 0.5 wt.-% to 15.0 wt.-% of methyl acrylate, the amounts here being based on 100 wt.-% of the polymerizable constituents. Particularly advantageous copolymers are those obtainable by copolymerization of from 90.0 wt.-% to 99.5 wt.-% of methyl methacrylate and from 0.5 wt.-% to 10.0 wt.-% of methyl acrylate, where the amounts are based on 100 wt.-% of the polymerizable constituents. For instance, the polyalkyl (meth)acrylates may comprise 91.0 wt.-% of methyl methacrylate and 9.0 wt.-% of methyl acrylate, 96.0 wt.-% of methyl methacrylate and 4.0 wt.-% of methyl acrylate or 99.0 wt.-% of methyl methacrylate and 1.0 wt.-% of methyl acrylate. The Vicat softening points VSP (ISO 306 (2013), method B50) of said polyalkyl(meth)acrylates is typically at least 90° C., preferably from 95° C. to 112° C.

The weight-average molar mass Mw of the polyalkyl (meth)acrylates is generally in the range from 80 000 g/mol to 300 000 g/mol. Particularly advantageous mechanical properties are obtained from foils with polyalkyl(meth) acrylates having an average molar mass Mw in the range from 80 000 g/mol to 200 000 g/mol, preferably in the range from 100 000 g/mol to 180 000 g/mol, more preferably in the range from 120 000 g/mol to 180 000 g/mol, in each case determined by means of GPC against PMMA calibration standards and THF as an eluent.

Suitable polyalkyl(meth)acrylates for use in the films of the present invention are commercially available from Evonik Performance Materials GmbH (Darmstadt, Germany) under the trademark PLEXIGLAS®. Such products include but are not limited to PLEXIGLAS® 7N, PLEXIGLAS® 7H, PLEXIGLAS® 8N, PLEXIGLAS® 8H and PLEXIGLAS® Heatresist FT15.

The film of the present invention typically comprises from 0.0 wt.-% to 30.0 wt.-%, preferably from 0.0 wt.-% to 25.0 wt.-%, more preferably from 0.0 wt.-% to 20.0 wt.-% of a polyalkyl(meth)acrylate, based on the weight of the poly (meth)acrylimide film.

Impact Modifiers

Impact modifiers for use in the present invention per se are well known and may have different chemical compositions and different polymer architectures. The impact modifiers may be crosslinked or thermoplastic. In addition, the impact modifiers may be in particulate form, as core-shell, as core-shell-shell or core-shell-shell-shell particles. Typically, particulate impact modifiers have an average particle diameter between 20 nm and 500 nm, preferably between 50 nm and 450 nm, more preferably between 100 nm and 400 nm and most preferably between 150 nm and 350 nm.

"Particulate" in this context means crosslinked impact modifiers which generally have a core-shell, core-shell-shell or core-shell-shell-shell structure. Average particle diameter can be determined by a method known to a skilled person, e.g. by photon correlation spectroscopy according to the norm DIN ISO 13321 (1996).

In the simplest case, particulate impact modifiers are crosslinked particles obtained by means of emulsion polymerization whose average particle diameter is in the range from 10 nm to 150 nm, preferably from 20 nm to 100 nm, in particular from 30 nm to 90 nm. These are generally composed of at least 20.0 wt.-%, preferably from 20.0 wt.-% to 99.0 wt.-%, particularly preferably in the range from 30.0 wt.-% to 98.0 wt.-% of butyl acrylate, and from 0.1 wt.-% to 2.0 wt.-%, preferably from 0.5 wt.-% to 1.0 wt.-% of a crosslinking monomer, e.g. a polyfunctional (meth)acrylate, e.g. allyl methacrylate and, if appropriate, other monomers, e.g. from 0.0 wt.-% to 10.0 wt.-%, preferably from 0.5 wt.-% to 5.0% wt.-%, of $C_1$-$C_4$-alkyl methacrylates, such as ethyl acrylate or butyl methacrylate, preferably methyl acrylate, or other vinylically polymerizable monomers, e.g. styrene.

Preferred impact modifiers are polymeric particles which can have a two- or three-layer core-shell structure and are obtained by emulsion polymerization (see, for example, EP-A 0 113 924, EP-A 0 522 351, EP-A 0 465 049 and EP-A 0 683 028). The films of present invention typically require suitable average particle diameter of these emulsion polymers in the range from 20 nm and 500 nm, preferably between 50 nm and 450 nm, more preferably between 100 nm and 400 nm and most preferably between 150 nm and 350 nm.

A three-layer or three-phase structure with a core and two shells can prepared as follows. The innermost (hard) shell can, for example, be composed in essence of methyl methacrylate, of small proportions of comonomers, e.g. ethyl acrylate, and of a proportion of crosslinking agent, e.g. allyl methacrylate. The middle (soft) shell can, for example, be composed of a copolymer comprising butyl acrylate and, if appropriate, styrene, while the outermost (hard) shell is in essence the same as the matrix polymer, thus bringing about compatibility and good linkage to the matrix.

The proportion of polybutyl acrylate in the core or in the shell of the impact modifier of a two- or three-layer core-shell structure is decisive for the impact-modifying action and is preferably in the range from 20.0 wt.-% to 99.0 wt.-%, particularly preferably in the range from 30.0 wt.-% to 98.0 wt.-%, even more preferably in the range from 40.0 wt.-% to 97.0 wt.-%, based on the total weight of the impact modifier.

In addition to particulate impact modifiers comprising copolymers of butyl acrylate, use of impact modifiers comprising siloxanes is also possible. However, use of such modifiers is less advantageous, because their presence in the poly(meth)acrylimide film tends to be disadvantageous for printability of the film.

Methyl methacrylate-butadiene-styrene (MBS) core-shell impact modifiers are also highly suitable for use in the film of the present invention because of their excellent compatibility with PMMI. The corresponding impact modifiers are commercially available from several manufacturers such as Arkema France under the trademark Clearstrength® and include products such as Clearstrength® XT100, Clearstrength® 140, Clearstrength® 223, Clearstrength® 303H, Clearstrength® 320, Clearstrength® 350, Clearstrength® 859. Equally suitable are MBS core-shell impact modifiers manufactured by The Dow Chemical Company under the trademark PARALOID™, for instance products PARAL- OID™ EXL-2620, PARALOID™ EXL™ 2650J, PARALOID™ EXL-2690, PARALOID™ EXL-2691, PARALOID™ EXL-2668 and PARALOID™ EXL-3361. Use of these impact modifiers allows preparation of PMMI films with particularly low haze values and excellent optical transparency.

In some embodiments, use of core-shell-shell-shell impact modifier is advantageous in terms of mechanical properties of the films of the present invention. The corresponding impact modifiers are described in detail in the patent application WO 2014/035608 A1, the entire disclosure of which is incorporated herein by reference.

Thermoplastic impact modifiers have a different mechanism of action than particulate impact modifiers. They are generally mixed with the matrix material. In the case that domains are formed, as occurs, for example, in the case of use of block copolymers, preferred sizes for these domains, the size of which can be determined, for example, by electron microscopy, correspond to preferred sizes for the core-shell particles.

There are various classes of thermoplastic impact modifiers. One example thereof are aliphatic TPUs (thermoplastic polyurethanes) e.g. Desmopan® products commercially available from Covestro AG. For instance, the TPUs Desmopan® WDP 85784A, WDP 85092A, WDP 89085A and WDP 89051D, all of which have refractive indices between 1.490 and 1.500, are particularly suitable as impact modifiers.

A further class of thermoplastic polymers suitable for use in the foil of the present invention as impact modifiers are methacrylate-acrylate block copolymers, especially acrylic TPE, which comprises PMMA-poly-n-butyl acrylate-PMMA triblock copolymers, and which are commercially available under the Kurarity® product name by Kuraray. The poly-n-butyl acrylate blocks form nanodomains in the polymer matrix having a size between 10 nm and 20 nm.

In addition to thermoplastic impact modifiers described above, use of thermoplastic impact modifiers comprising PVDF is also possible. However, use of such modifiers is less advantageous, because their presence in the poly(meth)acrylimide film tends to worsen printability of the film.

The film of the present invention typically comprises from 2.0 wt.-% to 50.0 wt.-%, preferably from 2.5 wt.-% to 40.0 wt.-%, more preferably from 4.0 wt.-% to 35.0 wt.-%, even more preferably from 6.0 wt.-% to 30.0 wt.-%, based on the weight of the poly(meth)acrylimide film.

Furthermore, the cumulative content of the poly(meth)acrylimide, polyalkyl(meth)acrylate and the impact modifier (hereinafter referred to as "impact-modified poly(meth)acrylimide") in the poly(meth)acrylimide film is usually adjusted to be from 60 wt.-% to 100 wt.-%, more preferably from 65.0 wt.-% to 90.0 wt.-%, even more preferably from 70.0 wt.-% to 85.0 wt.-%, yet even more preferably from 75.0 wt.-% to 80.0 wt.-%, even more preferably 85.0 wt.-% to 100.0 wt.-%, even more preferably 90.0 wt.-% to 100.0 wt.-%, still more preferably 95.0 wt.-% to 100.0 wt.-%, based on the weight of the poly(meth)acrylimide film.

Inorganic Fillers

Presence of inorganic fillers in the poly(meth)acrylimide film of the present invention serves several purposes. It is due to the presence of inorganic fillers in the specified amounts that poly(meth)acrylimide film has a rough surface with a non-glossy appearance and can be printed easily. The printing may be accomplished substantially by any method known in the prior art such as laser printing, inkjet printing, flexographic printing, digital printing or screen printing.

Furthermore, presence of inorganic fillers allows rendering the poly(meth)acrylimide film to have a desired colour and degree of transparency. For instance, presence of titanium dioxide in the poly(meth)acrylimide film renders the film white and substantially non-transparent.

Finally, as already explained above, the amount of inorganic filler was surprisingly found to have a strong effect on the film behaviour during its handling, in particular, on behaviour of the waste matrix after the kiss cutting step during manufacturing of forgery prevention labels.

To ensure a good handling of the poly(meth)acrylimide film during preparation and its further use in the manufacturing of forgery prevention labels it is of utmost importance that the content, in wt.-%, of one or several impact modifiers $n_{im}$ in the poly(meth)acrylimide film obeys the following relationship:

$$0.5*n_f \leq n_{im} \leq 1.8*n_f$$

$n_f$ being the content, in wt.-%, of one or several inorganic fillers in the poly(meth)acrylimide film.

If the content of one or several impact modifiers $n_{im}$ in the poly(meth)acrylimide film this lower than $0.5*n_f$ the film, in principle, still will be suitable for use in a forgery prevention label. However, it would no longer be possible to produce a plurality of individual forgery prevention labels attached side-by-side to the support layer by a process involving kiss cutting the face layer and the PSA layer, and then removing the surrounding waste matrix, leaving the plurality of individual labels adhered to the support layer (release liner). Such attempts would likely result in rupture of the waste matrix.

On the other hand, if the content of one or several impact modifiers $n_{im}$ in the poly(meth)acrylimide film is higher than $1.8*n_f$, $n_f$ being the content of one or several inorganic fillers in the poly(meth)acrylimide film, the brittleness of the film will be rather low. As a consequence, the risk of an unauthorised removal of the forgery prevention label from the original substrate will significantly increase.

Furthermore, for the sake of achieving an even better balance between processability of the poly(meth)acrylimide film and sensitivity of the resulting forgery prevention label it is particularly beneficial that the content, in wt.-%, of one or several impact modifiers $n_{im}$ in the poly(meth)acrylimide film obeys the following relationship:

$$0.55*n_f \leq n_{im} \leq 1.6*n_f$$

$n_f$ being the content, in wt.-%, of one or several inorganic fillers in the poly(meth)acrylimide film.

Furthermore, for the sake of achieving an even better balance between processability of the poly(meth)acrylimide film and sensitivity of the resulting forgery prevention label it is particularly advantageous that the content, in wt.-%, of one or several impact modifiers $n_{im}$ in the poly(meth)acrylimide film obeys the following relationship:

$$0.6*n_f \leq n_{im} \leq 1.5*n_f$$

$n_f$ being the content, in wt.-%, of one or several inorganic fillers in the poly(meth)acrylimide film.

Inorganic fillers for use in the present invention are not particularly limited and can, for instance, be selected from fillers such as titanium dioxide, zinc sulphide, zinc oxide, carbon black, silica, barium sulphate, aluminium trihydroxide or calcium carbonate or mixtures thereof.

Ideally, the inorganic fillers show a 45 µm screen residue of not more than 0.1 wt.-%, i.e. substantially no agglomerates with a particle size larger than 45 µm are present, which is highly advantageous for use according to the present invention. This allows the inorganic filler to be distributed in the matrix of poly(meth)acrylate film in a particularly homogeneous manner without large filler agglomerates being present so that the resulting film shows a substantially uniform visual appearance and has appropriate mechanical properties. Generally speaking, the presence of substantial amounts of larger filler agglomerates in the film is disadvantageous, since such agglomerates tend to initiate film cracks thereby reducing the initial tear strength at a random position of the film.

In a preferred embodiment, the inorganic fillers have a weight-average particle diameter $d_{50}$ ranging between 0.05 µm and 10.0 µm, more preferably between 0.1 µm and 5.0 µm, particularly preferably between 0.1 µm and 1.0 µm, even more preferably between 0.1 µm and 0.5 µm. The weight-average particle diameter $d_{50}$ can be determined by an appropriate method known to a skilled person, e.g. by photon correlation spectroscopy according to the norm DIN ISO 13321 (1996) upon using a commercially available instrument such as N5 Submicron Particle Size Analyzer from Beckman Coulter Inc or, for particles having a size of more than 1.0 µm, by static light scattering using an instrument such as SZ-10 Nanoparticle Analyzer from Horiba Scientific Ltd.

To ensure a particularly homogeneous dispersibility of inorganic filler particles in the poly(meth)acrylate-based matrix material it is further advantageous that the oil absorption of the inorganic filler is not less than 5 g/100 g filler, preferably not less than 10 g/100 g filler and particularly preferably not less than 15 g/100 g filler. It is further beneficial that the oil absorption of the inorganic filler is not more than 100 g/100 g filler, preferably not more than 70 g/100 g filler and particularly preferably not more than 50 g/100 g filler. The oil absorption can be determined according to the norm DIN EN ISO 787-5 (1995).

For instance, if a white colouring of the film is desired, titanium dioxide can be favourably employed as a filler. Typically, titanium dioxide in form of rutile or anatase may be used, whereby titanium dioxide in form of rutile is particularly preferred due to its low photocatalytic activity. Such materials can be manufactured by chloride process and are commercially available from various suppliers such as e.g. KRONOS TITAN GmbH (Leverkusen, Germany).

Suitable titanium dioxide fillers may be with or without modifications with water-insoluble oxides of aluminium, silicon, zinc, or other agents; these reagent materials are introduced specifically to improve those properties for which the pigment is used. The titanium dioxide fillers should ideally be free of extenders such as barium sulphate, clay, magnesium silicate, whiting, etc. Particularly preferred are titanium dioxide fillers of types II, III and IV according to the classification ASTM D476 (2015).

The film of the present invention usually comprises from 0.0 wt.-% to 40.0 wt.-%, preferably from 5.0 wt.-% to 40.0 wt.-%, more preferably from 8.0 wt.-% to 35.0 wt.-%, even more preferably from 10.0 wt.-% to 30.0 wt.-% of one or several inorganic fillers, based on the weight of the poly(meth)acrylimide film.

UV Absorbers and UV Stabilizers

UV absorbers and UV stabilizers for use in the film of the present invention are well known and described in detail by way of example in Hans Zweifel, Plastics Additives Handbook, Hanser Verlag, 5th Edition, 2001, p. 141 ff. UV stabilizers are understood to include UV stabilizers and free-radical scavengers.

UV absorbers can by way of example derive from the group of the substituted benzophenones, salicylic esters, cinnamic esters, oxanilides, benzoxazinones, hydroxyphenylbenzotriazoles, triazines or benzylidenemalonate. The best-known representatives of the UV stabilizers/free-radical scavengers are provided by the group of the sterically hindered amines (hindered amine light stabilizer, HALS).

Advantageously, the combination of UV absorbers and UV stabilizers as used in the poly(meth)acrylimide film is composed of the following components:
component A: a UV absorber of benzotriazole type,
component B: a UV absorber of triazine type,
component C: a UV stabilizer (HALS compound).

The individual components can be used in the form of an individual substance or in a mixture.

Benzotriazole type UV absorbers are known in the prior art and are typically 2-(2'-hydroxyphenyl)benzotriazoles. The corresponding compounds include in particular 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl) phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-metH-oxycarbonylethyl) phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxy-phenyl) benzotriazole, 2-(3'-dodecyl-2'-hydroxy-5'-methylphenyl) benzotriazole, 2-(3'-tert-butyl-2'-hydroxy-5'-(2-isooctyloxy-carbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH2CH2-COO—CH2CH2-, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]benzotriazole. Further examples of UV absorbers of benzotriazole type that can be used are 2-(2-hydroxy-5-methylphenyl)benzotriazole, 2-[2-hydroxy-3,5-di(α,α-dimethylbenzyl)phenyl]benzotriazole, 2-(2-hydroxy-3,5-di-tert-butylphenyl)benzotriazole, 2-(2-hydroxy-3,5-butyl-5-methylphenyl)-5-chlorobenzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-butylphenyl)benzotriazole, 2-(2-hydroxy-3-sec-butyl-5-tert-butylphenyl)benzotriazole and 2-(2-hydroxy-5-tert-octylphenyl)benzotriazole, phenol, 2,2'-methylenebis[6-(2H-benzotriazol-2-yl)-4-(1,1,3,3-tetramethylbutyl)].

These compounds are commercially available from BASF SE (Ludwigshafen, Germany) e.g. as Tinuvin® 360 and Tinuvin® 234.

The amounts used of the UV absorbers of benzotriazole type are from 0.1 wt.-% to 5.0 wt.-%, preferably from 0.2 wt.-% to 3.0 wt.-% and very particularly preferably from 0.5 wt.-% to 2.0 wt.-%, based on the weight of the poly(meth)

acrylimide film. It is also possible to use mixtures of different UV absorbers of benzotriazole type.

Triazine type UV absorbers are typically 2-(2-hydroxyphenyl)-1,3,5-triazines. Preferably used 2-(2-hydroxyphenyl)-1,3,5-triazines include inter alia 2,4,6-tris(2-hydroxy-4-octyloxyphenyl)-1,3,5-triazine, 2-(2-hydroxy-4-octyloxphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyl-oxyphenyl)-6-(2,4-dimethylphenyl)-1,3,5-triazine, 2-(2-hydroxy-4-octyloxphenyl)-4,6-bis(4-methylphenyl)-1,3,5-triazine, 2-(2-hydroxy-4-dodecyloxphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxpropoxy)-2-hydroxyphenyl]-4,6-bis(2,4-dimethylphenyl)-1,3,5-triazine, 2-[2-hydroxy-4-(2-hydroxy-3-dodecyloxpropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-di-methylphenyl)-1,3,5-triazine, 2,4-bis(4-[2-ethylhexyloxy]-2-hydroxyphenyl)-6-(4-methoxyphenyl)-1,3,5-triazine. Triazine type UV absorbers such as 2-(4,6-diphenyl-1,3,5-triazin-2-yl)-5-hexyloxyphenol, can also be used.

These compounds are e.g. commercially available from BASF SE (Ludwigshafen, Germany) under trademarks Tinuvin® 1600, Tinuvin® 1577 or Tinuvin® 1545.

The amounts of the triazine type UV absorber are from 0.1 to 5.0 wt.-%, preferably from 0.2 to 3.0 wt.-% and very particularly preferably from 0.5 to 2.0 wt.-%, based on the weight of the film. It is also possible to use mixtures of different triazine type UV absorbers.

The film of the present invention may further contain one or more UV stabilisers which typically act as antioxidants, radical scavengers, etc. Particularly preferred UV stabilisers are sterically hindered phenols and HALS type additives.

Sterically hindered amines, HALS (Hindered Amine Light Stabilizer) UV stabilizers are per se known. They can be used to inhibit ageing phenomena in paints and plastics, especially in polyolefin plastics (Kunststoffe, 74 (1984) 10, pp. 620-623; Farbe+Lack, Volume 96, September 1990, pp. 689-693). The tetramethylpiperidine group present in the HALS compounds is responsible for the stabilizing effect. This class of compound can have no substitution on the piperidine nitrogen or else substitution by alkyl or acyl groups on the piperidine nitrogen. The sterically hindered amines do not absorb in the UV region. They scavenge free radicals that have been formed, whereas the UV absorbers cannot do this. Examples of HALS compounds which have stabilizing effect and which can also be used in the form of mixtures are: bis(2,2,6,6-tetramethyl-4-piperidyl) sebacate, 8-acetyl-3-dodecyl-7,7,9,9-tetramethyl-1,3,8-triazaspiro(4,5)-decane-2,5-dione, bis(2,2,6,6-tetramethyl-4-piperidyl) succinate, poly(N-β-hydroxyethyl-2,2,6,6-tetramethyl-4-hydroxypiperidine succinate) or bis(N-methyl-2,2,6,6-tetramethyl-4-piperidyl) sebacate.

These compounds are e.g. commercially available from BASF SE (Ludwigshafen, Germany) under trademarks Tinuvin® 123, Tinuvin® 144 or Tinuvin® 292.

The amounts used of the HALS compounds in the film are typically from 0.0 to 5.0 wt.-%, preferably from 0.1 to 3.0 wt.-% and very particularly preferably from 0.2 to 2.0 wt.-%, based on the weight of the film. It is also possible to use mixtures of different HALS compounds.

Generally speaking, the film of the present invention usually comprises from 0.0 wt.-% to 5.0 wt.-%, of one or several UV-absorbers and from 0.0 wt.-% to 5.0 wt.-% of one or several UV-stabilizers, based on the weight of the poly(meth)acrylimide film.

Detailed Configuration of a Line Preferably Used for Producing the Films of the Present Invention The poly(meth)acrylimide film used in accordance with the invention is preferably produced by means of an extrusion process. In contrast to a film produced by a solution coating process, an extruded poly(meth)acrylimide film is substantially free of volatile organic compounds such as solvents, which is highly advantageous for toxicological and environmental reasons.

The above-described components of the poly(meth)acrylimide film can be blended before or even during the extrusion step.

For extrusion of the poly(meth)acrylimide film, a line having at least the following components can be used:
an extruder,
a melt pump,
an optional melt filtration facility,
an optional static mixing element,
a flat film die,
a polishing stack or chill roll, and
a winder.

Extruding polymers into films is widely known and is described for example in Kunststoffextrusionstechnik II, Hanser Verlag, 1986, p. 125 ff.

In the method of the invention, a hot melt is extruded from the die of the extruder onto a nip between two polishing rolls or onto a chill roll. The optimum melt temperature is dependent, for example, on the composition of the mixture and may therefore vary within wide ranges. Preferred temperatures of the moulding composition up to the point of die entry are in the range from 170° C. to 320° C., more preferably in the range from 200° C. to 290° C. and very preferably in the range from 220° C. to 280° C. The temperature of the polishing rolls is preferably less than or equal to 150° C., more preferably between 60° C. and 140° C.

In one embodiment, the temperature of the die is higher than the temperature of the mixture prior to die entry. The die temperature is preferably set 10° C., more preferably 20° C. and very preferably 30° C. higher than the temperature of the mixture prior to die entry. Accordingly, preferred temperatures of the die are in the range from 160° C. to 330° C., more preferably 190° C. to 300° C.

The polishing stack may consist of two or three polishing rolls. Polishing rolls are widely known in the art and are used to obtain a high gloss. Nevertheless, rolls other than polishing rolls e.g. matt rolls can also be used in the method of the invention. The nip between the first two polishing rolls forms a sheet which becomes a film by virtue of the simultaneous cooling.

The chill rolls used alternatively are also known to the skilled person. Here, the sheet of melt may be deposited onto a single cooled roll, which transports it further. Chill rolls are preferably located over the polishing stacks.

Alternatively, the extrusion can be carried out in a particularly advantageous way using equipment described in patent applications US 2016/015 9995 A1 and US 2017/030 6188 A1, the entire disclosure of which is incorporated herein by reference.

Particularly good surface quality of the film can be ensured by the die and roll having chrome surfaces, and especially by these chrome surfaces having a roughness Ra (according to DIN 4768 (1990)) of less than 0.10 µm, preferably less than 0.08 µm.

To ensure that that the poly(meth)acrylimide film is substantially free from impurities, a filter may be optionally located before the entry of the melt into the die. The mesh size of the filter is guided generally by the starting materials used, and may therefore vary within wide ranges. Mesh sizes generally are in the range from 300 µm to 20 µm. Filters having two or more screens of different mesh size may also be located before the point of die entry. These filters are available commercially. To obtain films of high quality, it is advantageous, moreover, to use particularly pure raw materials.

Optionally, furthermore, a static mixing element may be installed upstream of the flat film die. This mixing element can be used to mix components such as pigments, stabilizers or additives into the polymer melt, or up to 5 wt % of a second polymer, for example in the form of a melt, may be mixed from a second extruder into the material.

The pressure with which the melted mixture is pressed into the die may be controlled, for example, via the speed of the screw. The pressure is typically within a range of from 40 bar to 300 bar, without this limiting the method of the invention. Accordingly, the speed with which the films can be obtained in accordance with the invention is generally greater than 5 m/min, more particularly greater than 10 m/min.

In order to ensure a particularly uniform conveying of the melt, a melt pump may additionally be installed upstream of the flat film die.

In order to additionally improve handling of the extruded poly(meth)acrylimide film of the present invention, it is advantageous that a liner layer 5 is bound to the poly(meth) acrylimide film 6 from the step i) downstream of the extruder at a temperature below the glass transition temperature of the poly(meth)acrylimide, whereby a laminate 4 is obtained.

Figure 2:
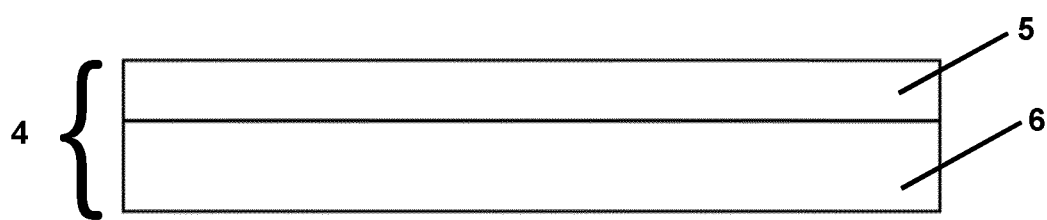
FIG. 2 side view of a laminate 4 for the manufacturing of forgery prevention labels comprising the liner layer 5 and the layer consisting of the poly(meth)acrylimide film 6.

The resulting laminate 4 will typically consist of the following two layers (cf. FIG. 2):
  layer formed by the poly(meth)acrylimide film 6; and
  a liner layer 5.

In one embodiment, the liner layer is self-adhesive. Such self-adhesive liner typically has an adhesive layer which can be advantageously used for binding the liner to poly(meth) acrylimide films 6 having a matt surface.

In a further embodiment, the liner layer has a layer of a polyethylene-copolymer instead of an adhesive layer. Such liners are advantageously employed for poly(meth)acrylimide films 6 having a glossy surface.

In order to ensure a good mechanical stability and, in particular, a high tear strength of the laminate 4, it is advantageous that the liner layer preferably has an initial tear resistance, measured according to ASTM D1004 (2013), of from 50 N to 500 N. The material of the liner layer is not particularly limited, as long as the liner layer has a sufficient tear resistance and can be selected from one of the following: polyethylene, polypropylene, polyethylene terephthalate or mixtures thereof, whereby a biaxially oriented polypropylene or a biaxially oriented polyethylene terephthalate are particularly preferred.

In the subsequent process steps, the laminate will undergo a step of binding an adhesive layer, optionally, a release coating layer and a support layer to deliver a label stock. These process steps are well-known to a skilled person and are explained in detail e.g. in patent applications US 2004/0091657 A1 and US 2011/0132522 A1.

Typically, the adhesive layer substantially consists of a pressure sensitive adhesive (PSA). The support layer typically comprises a paper or plastic film material and may be coated by release coating layer. Various release coating compositions are known such as those described U.S. Pat. No. 6,406,787. Non-PSA adhesive compositions may also be used particularly for embodiments wherein the form support layer is porous (e.g. paper), the form substrate being exposed on the non-viewing surface of the label.

PSAs suitable in the present invention are preferably selected from the group consisting of alkylacrylate polymers and copolymers; copolymers of alkylacrylates with acrylic acid; terpolymers of alkylacrylates, acrylic acid, and vinyllactates; alkyl vinyl ether polymers and copolymers; polyisoalkylenes; polyalkyldienes; alkyldiene-styrene copolymers; styrene-isoprene-styrene block copolymers; polydialkylsiloxanes; polyalkylphenylsiloxanes; natural rubbers; synthetic rubbers; chlorinated rubbers; latex crepe; rosin; cumarone resins; alkyd polymers; and polyacrylate esters and mixtures thereof. Examples include polyisobutylenes, polybutadienes, or butadiene-styrene copolymers, and mixtures thereof (such polymers and copolymers preferably have no reactive moieties, i.e. are not oxidized in the presence of air); silicone-based compounds such as polydimethylsiloxane, and polymethylphenylsiloxane combined with other resins and/or oils.

Other suitable PSAs also include tackified thermoplastic resins and tackified thermoplastic elastomers, wherein the tackifier comprises one or more compounds which increases the tack of the composition. An example of a tackified thermoplastic resin useful as an aggressively PSA is the combination of a vinyl acetate/ethylene copolymer known under the trade designation VYNATHENE EY 902-30 (available from Quantum Chemicals, Cincinnati, Ohio) with substantially equal portions of the tackifiers known under the trade designations PICCOTEX LC (a water-white thermoplastic resin produced by copolymerization of vinyltoluene and alpha-methylstyrene monomers having a ring and ball softening point of about 87° C. to 95° C., available from Hercules Incorporated, Wilmington, Del.) and WINGTACK 10 (a liquid aliphatic C-5 petroleum hydrocarbon resin available from Goodyear Chemical) and an organic solvent such as toluene. An example of a tackified thermoplastic elastomer useful as an aggressively PSA is the combination of the styrene-poly(ethylene-butylene)-styrene block copolymer known under the trade designation KRATON G1657 (available from of Shell Chemicals) with one or more of the low molecular weight hydrocarbon resins known under the trade designation REGALREZ (from Hercules) and an organic solvent such as toluene. Both of these formulations may be coated using a knife coater and air-dried, or air-dried followed by oven drying. Of course, the invention is not limited to use of these specific combinations of thermoplastic resins, thermoplastic elastomers, and tackifiers.

Some presently preferred PSAs exhibit extended shelf life and resistance to detackifying under atmospheric conditions, and include acrylic-based copolymer adhesives as disclosed in U.S. Pat. No. Re 24,906. One example of such an acrylic-based copolymer is a 95.5:4.5 (measured in parts by weight of each) isooctylacrylate/acrylic acid copolymer. Another preferred adhesive is the copolymer of a 90:10 weight ratio combination of these two monomers. Yet other preferred adhesives are terpolymers of ethyl acrylate, butyl acrylate, and acrylic acid; copolymers of isooctylacrylate and acrylamide; and terpolymers of isooctylacrylate, vinyl-acetate, and acrylic acid.

Acrylic-based PSAs can be coated out of a coatable composition comprising an organic solvent, such as a heptane:isopropanol solvent mixture, and the solvent subsequently evaporated, leaving a pressure-sensitive adhesive coating. This layer is preferably from about 0.038 centimeters (cm) to about 0.11 cm (5 to 15 mils) thick when the substrate is a retroreflective sheeting material.

PSAs useful in the invention also may be characterized by having 180° peel adhesion ranging from about 10 to about 1000 g/cm, more preferably at least about 50 g/cm. For aggressive PSAs the 180° peel adhesion typically ranges from about 200 g/cm to about 600 g/cm, measured using a standard test procedure. In this procedure, the force necessary to remove (i.e. peel) a PSA-coated substrate from a test substrate when the PSA-coated substrate is peeled from the test substrate is termed the "peel adhesion" value. A standard glass plate is cleaned using a solvent (such as one wash of diacetone alcohol followed by three washes of n-heptane). With very light tension, a sample having a PSA-backsize coating is then applied along the center of the standard glass plate, PSA side down. The sample is then rolled once with a 2.04 kg hand roller. The standard glass plate is then secured to a horizontal plate in a standard peel adhesion tester such as that known under the trade name "IMASS." One end of the sample is then attached to a hook which is a part of the peel adhesion tester. The sample is peeled from the standard glass plate at a 180° angle (i.e., one end of the sample is pulled toward the other end) by moving the platen horizontally at a speed of 228.6 cm/min, and the force required recorded, in g/cm of sample width, for various dwell times.

The release coating layer 8, which is typically a siloxane coating, serves the purpose of reducing the adhesion between the adhesive layer 7 and the support layer 9. Typically, the release coating layer 8 allows to achieve a kinetic coefficient of friction below 0.35, preferably below 0.25, determined according to the norm ASTM D1894 (2014).

Finally, the label stock will undergo a kiss cutting to form a plurality of individual self-adhesive forgery prevention labels bound to a support layer 9. The kiss cutting may be performed by means of a mechanical die cutting as described in US 2011/0132522 A1 or by using a laser. In the subsequent step, the waste matrix surrounding the individual self-adhesive forgery prevention labels will be peeled off from the support layer without any risk of rupture.

To minimise a waste formation, the distance between individual labels (i.e. the width of the stripes in the waste matrix) is kept in the range of from 1.0 mm to 10.0 mm, more preferably from 2.0 mm to 8.0 mm, even more preferably from 3.0 mm to 5.0 mm. As explained above, no undesired waste matrix rupture takes place. Typically, the release force during this operation is below 30 g/inch, preferably below 20 g/inch, even more preferably from 1 g/inch to 10 g/inch, measured using T-peel test with a Tesaband® 7475 tape from tesa SE (Norderstedt, Germany).

Forgery Prevention Labels

Figure 3:
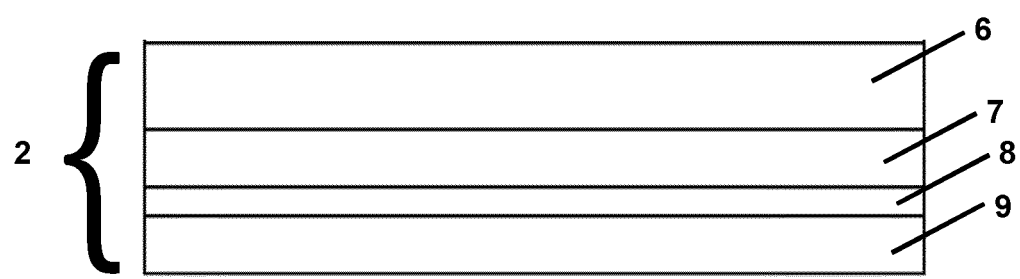
FIG. 3 side view of a forgery prevention label 2 comprising at least the following layers:
a) a layer consisting of the poly(meth)acrylimide film 6;
b) an adhesive layer 7;
c) optionally, a release coating layer 8, and
d) a support layer 9.

Forgery prevention label 2 of the present invention comprise at least the following layers in the order stated (cf. FIG. 3):
 a) a layer 6 consisting of extruded poly(meth)acrylimide film as described above;
 b) an adhesive layer 7;
 c) a release coating layer 8, and
 d) a support layer 9.

Typically, the forgery prevention label the present invention has a thickness of between 50.0 µm and 300.0 µm, more preferably between 100.0 µm and 200.0 µm.

In a typical embodiment,
 the PMMI layer 6 may have a thickness of from 20 µm to 100 µm, more preferably of from 30 µm to 75 µm, even more preferably of from 40 µm to 60 µm;
 the adhesive layer 7 may have a thickness of from 10 µm to 40 µm, more preferably of from 20 µm to 30 µm;
 the release coating layer 8 may have a thickness of from 0.01 µm to 1.5 µm, preferably of from 0.5 µm to 1.2 µm, more preferably of 0.6 µm to 0.8 µm; and
 the support layer 9 may have a thickness of from 20 µm to 70 µm, preferably of from 30 µm to 50 µm;

The size of the forgery prevention labels can in principle be freely selected and is only limited by the dimension extrusion die and/or the polishing stack used for their production. This means that the formats are substantially freely selectable.

The trimming and kiss cutting of the poly(meth)acrylimide film is preferably accomplished by means of die cutting, cutting, laser cutting or laser die cutting. Particular preference is given to laser cutting or laser die cutting.

Optionally, but not necessarily, the poly(meth)acrylimide films produced in accordance with the invention may be provided additionally with ridges, cuts, slits or perforation or notches in order to additionally facilitate destruction of the labels during an attempt of their non-authorised removal. However, such additional means are not essential.

The forgery prevention labels are highly suitable for producing electronic product identification label, automotive under-the-hood label, chip cards, heat resistant documents and seals. One illustrative example of the use is that, for example, barcode labels on various parts of an automotive engine. The labels can withstand operating temperatures of the engine without any noticeable shrinkage and are also chemically resistant to fluids such as brake fluid, hydraulic fluid, engine oil etc. The label will become destroyed upon an unauthorised attempt to peel it off from an engine part in order to transfer it to a replaceable non-genuine engine part.

As a further example, the labels of the present invention can bear a vehicle identification number and can be advantageously used under the hood of a vehicle. An unauthorised attempt to remove the label from a vehicle in order to attach it to a different vehicle will result in label destruction.

In summary, the following aspects and embodiments {1} to {15} of the present invention showed to be particularly advantageous:

{1} A poly(meth)acrylimide film for use in a forgery prevention label, wherein the poly(meth)acrylimide film comprises:
 from 30.0 wt.-% to 98.0 wt.-% of a poly(meth)acrylimide;
 from 2.0 wt.-% to 50.0 wt.-% of one or several impact modifiers;
 from 0.0 wt.-% to 30.0 wt.-% of a polyalkyl(meth) acrylate;
 from 0.0 wt.-% to 40.0 wt.-% of one or several inorganic fillers;
 from 0.0 wt.-% to 5.0 wt.-% of one or several UV-absorbers; and
 from 0.0 wt.-% to 5.0 wt.-% of one or several UV-stabilizers, based on the weight of the poly(meth)acrylimide film;
 wherein the poly(meth)acrylimide comprises at least 50 wt.-%, preferably at least 60 wt.-%, most preferably at least 70 wt.-%, based on the weight of the poly(meth)acrylimide, of repeating units of Formula (I)

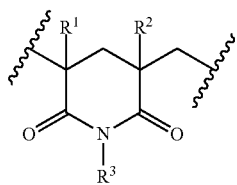

(I)

in which $R^1$ and $R^2$ are independently selected from hydrogen and a methyl group, $R^1$ and $R^2$ being preferably represented by a methyl group, and $R^3$ is hydrogen or a $C_1$-$C_4$-alkyl group, preferably a methyl group; and the cumulative content of the poly(meth)acrylimide, polyalkyl(meth)acrylate and the impact modifier is from 60.0 wt.-% to 100.0 wt.-%, based on the weight of the poly(meth)acrylimide film.

{2} Poly(meth)acrylimide film according to {1}, wherein the poly(meth)acrylimide film comprises:

from 30.0 wt.-% to 92.5 wt.-% of a poly(meth)acrylimide;

from 2.5 wt.-% to 40.0 wt.-% of one or several impact modifiers;

from 0.0 wt.-% to 30.0 wt.-% of a polyalkyl(meth)acrylate;

from 5.0 wt.-% to 40.0 wt.-% of one or several inorganic fillers;

from 0.0 wt.-% to 5.0 wt.-% of one or several UV-absorbers; and from 0.0 wt.-% to 5.0 wt.-% of one or several UV-stabilizers, based on the weight of the poly(meth)acrylimide film;

wherein the cumulative content of the poly(meth)acrylimide, polyalkyl(meth)acrylate and the impact modifier is from 60.0 wt.-% to 95.0 wt.-%, based on the weight of the poly(meth)acrylimide film; and the content, in wt.-%, of one or several impact modifiers $n_{im}$ in the poly(meth)acrylimide film is described by the following relationship:

$$0.5*n_f \leq n_{im} \leq 1.8*n_f$$

$n_f$ being the content, in wt.-%, of one or several inorganic fillers in the poly(meth)acrylimide film.

{3} Poly(meth)acrylimide film according to {1} or {2}, wherein the poly(meth)acrylimide film has thickness of from 15.0 μm to 120.0 μm, and a nominal elongation at break of from 3.0% to 30%, measured according to DIN EN ISO 527-3/2/100 (2003) with a foil having a thickness of 50.0 μm, and tensile stress of from 20.0 MPa to 70.0 MPa, measured according to DIN EN ISO 527-3/2/100 (2003) with a foil having a thickness of 50.0 μm.

{4} Poly(meth)acrylimide film according to at least one of {1} to {3}, wherein the poly(meth)acrylimide film has resistance to tear propagation, measured according to ASTM D1938 (2014) with a foil having a thickness of 50.0 μm, of from 0.01 N/mm to 1.50 N/mm.

{5} Poly(meth)acrylimide film according to at least one of {1} to {4}, wherein the content, in wt.-%, of one or several impact modifiers $n_{im}$ in the poly(meth)acrylimide film is described by the following relationship:

$$0.6*n_f \leq n_{im} \leq 1.5*n_f$$

$n_f$ being the content, in wt.-%, of one or several inorganic fillers in the poly(meth)acrylimide film.

{6} Poly(meth)acrylimide film according to at least one of {1} to {5}, characterized in that the one or several inorganic fillers are selected from titanium dioxide, silica, zinc oxide, zinc sulphide, barium sulphate, carbon black, aluminium trihydroxide or calcium carbonate.

{7} Poly(meth)acrylimide film according to at least one of {1} to {6}, characterized in that the poly(meth)acrylimide has an average molar weight Mw of from 80 000 g/mol to 200 000 g/mol, preferably from 90 000 g/mol to 150 000 g/mol.

{8} A forgery prevention label comprising a poly(meth)acrylimide film according to at least one of {1]} to {7}.

{9} Forgery prevention label according to of {8}, characterized in that the forgery prevention label comprises at least the following layers in the order stated:

a) a layer consisting of the poly(meth)acrylimide film according to at least one of {1} to {7}, preferably having a thickness of from 40.0 μm to 60.0 μm;

b) an adhesive layer, preferably having a thickness of from 20.0 μm to 30.0 μm;

c) a release coating layer, preferably having a thickness of from 0.6 μm to 0.8 μm; and d) a support layer, preferably having a thickness of from 30.0 μm to 50.0 μm;

and/or the forgery prevention label has a thickness of between 50.0 μm and 300.0 μm.

{10} Laminate for the manufacturing of a forgery prevention label according to {8} or {9}, the laminate comprising at least the following layers:

a) a liner layer preferably having initial tear resistance of from 50 N to 500 N, measured according to ASTM D1004 (2013) with a foil having a thickness of 50.0 μm; and b) a layer consisting of the poly(meth)acrylimide film as specified in at least one of {1} to {7}.

{11} Laminate according to {10}, wherein the liner layer substantially consists of a polymeric material selected from the group consisting of polyethylene, polypropylene and polyethylene terephthalate, preferably a biaxially oriented polypropylene or a biaxially oriented polyethylene terephthalate.

{12} Process for the manufacturing of a laminate according to {10} or {11}, the process comprising at least the following steps:

i) preparation of a poly(meth)acrylimide film according to at least one of {1} to {7} using an extruder, wherein the poly(meth)acrylimide film is obtained; and ii) binding a liner layer to the poly(meth)acrylimide film from the step i) downstream of the extruder.

{13} Process according to {12}, wherein the laminate obtained in step ii) is passed between a plurality of rolls, wherein at least a roll facing towards the side of the poly(meth)acrylimide film is a cooled roll.

{14} Process for the manufacturing of a forgery prevention label according to {8} or {9}, the process comprising at least the following steps:

i) preparation of a poly(meth)acrylimide film according to at least one of {1} to {7} using an extruder;

ii) binding a liner layer to the poly(meth)acrylimide film from the step i) downstream of the extruder, wherein a laminate is obtained;

iii) binding an adhesive layer, optionally, a release coating layer and a support layer onto the laminate from step ii), wherein a label stock is obtained; and iv) kiss cutting the label stock obtained in the step iii) and removing the resulting waste matrix, wherein a plurality of individual self-adhesive forgery prevention labels on a support layer is obtained.

{15} Use of a forgery prevention label according to {8} to {9} for the manufacturing of chip cards, documents, forgery prevention labels, electronic product identification labels, automotive under-the-hood labels, document seals or price tags.

EXAMPLES

Example 1 (Comparative)

A PMMA film having a total thickness of 50 µm was prepared using a compounded mixture of the following composition:
a) 30.0 wt.-% of a material comprising 47.0 wt.-% of a butylacrylate-based acrylic core-shell-shell impact modifier,
b) 48.67 wt.-% of PLEXIGLAS® 7N, available from Evonik Performance Materials GmbH, and
c) 21.33 wt.-% of titanium dioxide, available from KRONOS TITAN GmbH The extrusion was carried out at the extrusion speed of 7.3 m/min using a 35 mm-diameter single screw extruder from Dr. Collin GmbH (Ebersberg, Germany) under the following conditions:
Screw temperature in the extruder: 240° C. to 270° C.
Die temperature: 240° C. to 260° C.
Temperature of the melt at the die: 240° C. to 260° C.
Roll temperature: 50° C. to 120° C.
The extruded film had elongation at break of 4 to 6% in extrusion direction.

Subsequently, the extruded film was used for the preparation of self-adhesive forgery prevention labels upon using a label manufacturing machine MPS EF Flexo from MPS Systems B.V. (Arnhem, The Netherlands).

The film could be successfully used for the manufacturing of self-adhesive forgery prevention labels. No undesired rupture of the waste matrix took place.

The tear resistance tests were carried out using a testing system Zwick Roell Z005, available from Zwick GmbH & Co.KG (Ulm, Germany) with 4 identical samples, wherein 5 tests were carried out for each sample.

The initial tear resistance, measured using samples having a width of from 10 mm to 20 mm according to the norm ASTM D1004 (2013) in the direction of extrusion of the films was 5.8 N to 7.0 N.

The shrinkage of the sample, measured at 120° C. (30 minutes) according to standard EN ISO 11501 (2004) was 6.6% in extrusion direction and 1.1% in cross direction. Materials having such a high shrinkage at increased temperatures are usually not suitable for labelling parts of a vehicle which can reach such temperature.

Example 2 (Inventive)

A film having a total thickness of 50 µm was prepared using a compounded mixture of the following composition:
a) 30.0 wt.-% of a material comprising 47 wt.-% of a butylacrylate-based acrylic core-shell-shell impact modifier,
b) 55.0 wt.-% of a material comprising:
40 wt.-% of titanium dioxide, available from KRONOS TITAN GmbH and
60 wt.-% of PLEXIMID® TT50, available from Evonik Performance Materials GmbH;
c) 15.0 wt.-% of PLEXIMID® TT50, available from Evonik Performance Materials GmbH The extrusion was carried out at the extrusion speed of 7.3 m/min using a 35 mm-diameter single screw extruder from Dr. Collin GmbH (Ebersberg, Germany) under the following conditions:
Screw temperature in the extruder: 270° C. to 285° C.
Die temperature: 270° C. to 275° C.
Temperature of the melt at the die: 270° C. to 275° C.
Roll temperature: 50° C. to 120° C.
The extruded film had a nominal elongation at break of 7.4% and tensile strength of 59.1 MPa in extrusion direction.

Subsequently, the extruded film was used for the preparation of self-adhesive forgery prevention labels upon using a label manufacturing machine MPS EF Flexo from MPS Systems B.V. (Arnhem, The Netherlands).

The film could be successfully used for the manufacturing of self-adhesive forgery prevention labels. No undesired rupture of the waste matrix took place.

The shrinkage of the sample, measured at 120° C. (30 minutes) according to standard EN ISO 11501 (2004) was 0.3% in extrusion direction and 0.2% in cross direction. The label can be advantageously used for labelling vehicle parts which are operated at such temperatures.

Example 3 (Inventive)

A film having a total thickness of 50 µm was prepared using a compounded mixture of the following composition:
a) 15.0 wt.-% of a butylacrylate-based acrylic core-shell-shell impact modifier,
b) 55.0 wt.-% of a material comprising:
40 wt.-% of titanium dioxide, available from KRONOS TITAN GmbH and
60 wt.-% of PLEXIMID® TT50, available from Evonik Performance Materials GmbH;
c) 30.0 wt.-% of PLEXIMID® TT50, available from Evonik Performance Materials GmbH The extrusion was carried out at the extrusion speed of 7.3 m/min using a 35 mm-diameter single screw extruder from Dr. Collin GmbH (Ebersberg, Germany) under the following conditions:
Screw temperature in the extruder: 270° C. to 285° C.
Die temperature: 270° C. to 275° C.
Temperature of the melt at the die: 270° C. to 275° C.
Roll temperature: 50° C. to 120° C.
The extruded film had a nominal elongation at break of 11.1% and tensile strength of 54.5 MPa in extrusion direction.

Subsequently, the extruded film was used for the preparation of self-adhesive forgery prevention labels upon using a label manufacturing machine MPS EF Flexo from MPS Systems B.V. (Arnhem, The Netherlands).

The film could be successfully used for the manufacturing of self-adhesive forgery prevention labels. No undesired rupture of the waste matrix took place.

The shrinkage of the sample, measured at 120° C. (30 minutes) according to standard EN ISO 11501 (2004) was 0.1% in extrusion direction and 0.1% in cross direction. The label can be advantageously used for labelling various vehicle parts which are operated at such temperatures.

Example 4 (Inventive)

A film having a total thickness of 50 µm was prepared using a compounded mixture of the following composition:
a) 20.0 wt.-% of a butylacrylate-based acrylic core-shell-shell impact modifier,
b) 55.0 wt.-% of a material comprising:
40 wt.-% of titanium dioxide, available from KRONOS TITAN GmbH and
60 wt.-% of PLEXIMID® TT50, available from Evonik Performance Materials GmbH;
c) 25.0 wt.-% of PLEXIMID® TT50, available from Evonik Performance Materials GmbH The extrusion was carried out at the extrusion speed of 7.3 m/min using a 35 mm-diameter single screw extruder from Dr. Collin GmbH (Ebersberg, Germany) under the following conditions:

Screw temperature in the extruder: 270° C. to 285° C.
Die temperature: 270° C. to 275° C.
Temperature of the melt at the die: 270° C. to 275° C.
Roll temperature: 50° C. to 120° C.

The extruded film had a nominal elongation at break of 12.8% and tensile strength of 50.3 MPa in extrusion direction.

Subsequently, the extruded film was used for the preparation of self-adhesive forgery prevention labels upon using a label manufacturing machine MPS EF Flexo from MPS Systems B.V. (Arnhem, The Netherlands).

The film could be successfully used for the manufacturing of self-adhesive forgery prevention labels. No undesired rupture of the waste matrix took place.

The shrinkage of the sample, measured at 120° C. (30 minutes) according to standard EN ISO 11501 (2004) was 0.2% in extrusion direction and 0.1% in cross direction. The label can be advantageously used for labelling various vehicle parts which are operated at such temperatures.

Example 5 (Inventive)

A film having a total thickness of 50 μm was prepared using a compounded mixture of the following composition:
a) 25.0 wt.-% of a butylacrylate-based acrylic core-shell-shell impact modifier,
b) 55.0 wt.-% of a material comprising:
40 wt.-% of titanium dioxide, available from KRONOS TITAN GmbH and
60 wt.-% of PLEXIMID® TT50, available from Evonik Performance Materials GmbH;
c) 20.0 wt.-% of PLEXIMID® TT50, available from Evonik Performance Materials GmbH The extrusion was carried out at the extrusion speed of 7.3 m/min using a 35 mm-diameter single screw extruder from Dr. Collin GmbH (Ebersberg, Germany) under the following conditions:

Screw temperature in the extruder: 270° C. to 285° C.
Die temperature: 270° C. to 275° C.
Temperature of the melt at the die: 270° C. to 275° C.
Roll temperature: 50° C. to 120° C.

The extruded film had a nominal elongation at break of 18.2% and tensile strength of 45.2 MPa in extrusion direction.

Subsequently, the extruded film was used for the preparation of self-adhesive forgery prevention labels upon using a label manufacturing machine MPS EF Flexo from MPS Systems B.V. (Arnhem, The Netherlands).

The film could be successfully used for the manufacturing of self-adhesive forgery prevention labels. No undesired rupture of the waste matrix took place.

The shrinkage of the sample, measured at 120° C. (30 minutes) according to standard EN ISO 11501 (2004) was 0.4% in extrusion direction and 0.1% in cross direction. The label can be advantageously used for labelling various vehicle parts which are operated at such temperatures.

Example 6 (Inventive)

A film having a total thickness of 50 μm was prepared using a compounded mixture of the following composition:
a) 10.0 wt.-% of a butylacrylate-based acrylic core-shell-shell impact modifier b) 90.0 wt.-% of PLEXIMID® TT50, available from Evonik Performance Materials GmbH The extrusion was carried out at the extrusion speed of 7.3 m/min using a 35 mm-diameter single screw extruder from Dr. Collin GmbH (Ebersberg, Germany) under the following conditions:

Screw temperature in the extruder: 270° C. to 285° C.
Die temperature: 270° C. to 275° C.
Temperature of the melt at the die: 270° C. to 275° C.
Roll temperature: 50° C. to 120° C.

The extruded film had a nominal elongation at break of 5.6% and tensile strength of 85.1 MPa in extrusion direction and a nominal elongation at break of 4.5% and tensile strength of 54.8 MPa in cross direction.

Haze of the film was 12.60%.

Example 7 (Inventive)

A film having a total thickness of 50 μm was prepared using a compounded mixture of the following composition:
a) 10.0 wt.-% of a butylacrylate-based core-shell impact modifier,
b) 90.0 wt.-% of PLEXIMID® TT50, available from Evonik Performance Materials GmbH The extrusion was carried out at the extrusion speed of 7.3 m/min using a 35 mm-diameter single screw extruder from Dr. Collin GmbH (Ebersberg, Germany) under the following conditions:

Screw temperature in the extruder: 270° C. to 285° C.
Die temperature: 270° C. to 275° C.
Temperature of the melt at the die: 270° C. to 275° C.
Roll temperature: 50° C. to 120° C.

The extruded film had a nominal elongation at break of 5.4% and tensile strength of 48.7 MPa in extrusion direction and a nominal elongation at break of 4.0% and tensile strength of 11.0 MPa in cross direction.

Haze of the film was 7.22%.

Example 8 (Inventive)

A film having a total thickness of 50 μm was prepared using a compounded mixture of the following composition:
a) 10.0 wt.-% of an MBS-based core-shell impact modifier
b) 90.0 wt.-% of PLEXIMID® TT50, available from Evonik Performance Materials GmbH The extrusion was carried out at the extrusion speed of 7.3 m/min using a 35 mm-diameter single screw extruder from Dr. Collin GmbH (Ebersberg, Germany) under the following conditions:

Screw temperature in the extruder: 270° C. to 285° C.
Die temperature: 270° C. to 275° C.
Temperature of the melt at the die: 270° C. to 275° C.
Roll temperature: 50° C. to 120° C.

The extruded film had a nominal elongation at break of 10.2% and tensile strength of 73.5 MPa in extrusion direction and a nominal elongation at break of 5.2% and tensile strength of 54.4 MPa in cross direction.

Haze of the film was 5.51%.

The invention claimed is:
1. A poly(meth)acrylimide film for use in a forgery prevention label, wherein the poly(meth)acrylimide film comprises:
from 30.0 wt.-% to 92.5 wt.-% of a poly(meth)acrylimide;
from 2.5 wt.-% to 40.0 wt.-% of one or several impact modifiers;

from 0.0 wt.-% to 30.0 wt.-% of a polyalkyl(meth)acrylate;
from 5.0 wt.-% to 40.0 wt.-% of one or several inorganic fillers;
from 0.0 wt.-% to 5.0 wt.-% of one or several UV-absorbers; and
from 0.0 wt.-% to 5.0 wt.-% of one or several UV-stabilizers, based on the weight of the poly(meth)acrylimide film;
wherein the poly(meth)acrylimide comprises at least 50 wt-%, based on the weight of the poly(meth)acrylimide, of repeating units of Formula (1)

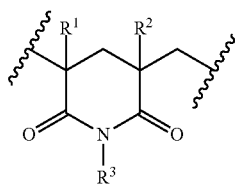

(I)

in which $R^1$ and $R^2$ are independently selected from hydrogen and a methyl group, and
$R^3$ is hydrogen or a $C_1$-$C_4$-alkyl group; and
wherein a cumulative content of the poly(meth)acrylimide, the polyalkyl(meth)acrylate, and the impact modifier is from 60.0 wt.-% to 95.0 wt.-%, based on the weight of the poly(meth)acrylimide film; and
a content, in wt.-%, of the one or several impact modifiers $n_{im}$ in the poly(meth)acrylimide film is described by the following relationship:

$$0.5*n_f \leq n_{im} \leq 1.8*n_f$$

wherein $n_f$ is a content, in wt.-%, of the one or several inorganic fillers in the poly(meth)acrylimide film.

2. The poly(meth)acrylamide film according to claim 1, wherein the poly(meth)acrylimide film has thickness of from 15.0 μm to 120.0 μm, and
a nominal elongation at break of from 3.0% to 30%, measured according to DIN EN ISO 527-3/2/100 (2003) with a foil having a thickness of 50.0 μm, and tensile stress of from 20.0 MPa to 70.0 MPa, measured according to DIN EN ISO 527-3/2/100 (2003) with a foil having a thickness of 50.0 μm.

3. The poly(meth)acrylamide film according claim 1, wherein the poly(meth)acrylimide film has a resistance to tear propagation, measured according to ASTM D1938 (2014) with a foil having a thickness of 50.0 μm, of from 0.01 N/mm to 1.50 N/nm.

4. The poly(meth)acrylimide film according to claim 1, wherein a content, in wt.-%, of the one or several impact modifiers $n_{im}$ in the poly(meth)acrylimide film is described following relationship:

$$0.6*n_f \leq n_{im} \leq 1.5*n_f$$

wherein $n_f$ is a content, in wt.-%, of the one or several inorganic fillers in the poly(meth)acrylimide film.

5. The poly(meth)acrylimide film according to claim 1, wherein the one or several inorganic fillers are selected from the group consisting of titanium dioxide, silica, zinc oxide, zinc sulphide, barium sulphate, carbon black, aluminium trihydroxide, and calcium carbonate.

6. The poly(meth)acrylimide film according to claim 1, wherein the poly(meth)acrylimide has an average molar weight Mw of from 80,000 g/mol to 200,000 g/mol, determined by GPC using polymethyl methacrylate as a standard.

7. A forgery prevention label comprising the poly(meth)acrylimide film according to claim 1.

8. The forgery prevention label according to claim 7, wherein the forgery prevention label comprises at least the following layers in the order stated:
a) a layer consisting of the poly(meth)acrylimide film;
b) an adhesive layer;
c) a release coating layer; and
d) a support layer; and/or
wherein the forgery prevention label has a thickness of between 50.0 μm and 300.0 μm.

9. A laminate for manufacturing of the forgery prevention label according to claim 7, the laminate comprising at least the following layers:
a) a liner layer; and
b) a layer consisting of the poly(meth)acrylimide film.

10. The laminate according to claim 9, wherein the liner layer substantially contains a polymeric material wherein the polymeric material is selected from the group consisting of polyethylene, polypropylene, and polyethylene terephthalate.

11. A process for manufacturing of the laminate according to claim 9, the process comprising at least the following:
i) preparing the poly(meth)acrylimide film using an extruder, wherein the poly(meth)acrylimide film is obtained; and
ii) binding a liner layer to the poly(meth)acrylimide film from i) downstream of the extruder, to obtain the laminate.

12. The process according to claim 11, wherein the laminate obtained in ii) is passed between a plurality of rolls, wherein at least a roll facing towards the side of the poly(meth)acrylimide film is a cooled roll.

13. A process for manufacturing of a forgery prevention label according to claim 7, the process comprising at least the following:
i) preparing the poly(meth)acrylimide film using an extruder;
ii) binding a liner layer to the poly(meth)acrylimide film from i) downstream of the extruder, wherein a laminate is obtained;
iii) binding an adhesive layer, optionally, a release coating layer, and a support layer onto the laminate from ii), wherein a label stock is obtained; and
iv) kiss cutting the label stock obtained in iii) and removing resulting waste matrix, wherein a plurality of individual self-adhesive forgery prevention labels on a support layer is obtained.

14. A method, comprising:
manufacturing an article comprising the forgery prevention label according to claim 7,
wherein the article is selected from the group consisting of chip cards, documents, forgery prevention labels, electronic product identification labels, automotive under-the-hood labels, document seals, and price tags.

15. The poly(meth)acrylimide film according claim 2, wherein the poly(meth)acrylamide film has a resistance to tear propagation, measured according to ASTM D938 (2014) with a foil having a thickness of 50.0 μm, of from 0.01 N/mm to 1.50 N/mm.

16. The poly(meth)acrylimide film according claim 2, wherein the content, in wt.-%, of the one or several impact modifiers min in the poly(meth)acrylimide film is described by the following relationship:

$$0.6*n_f \leq n_{im} \leq 1.5*n_f$$

wherein $n_f$ is the content, in wt.-%, of the one or several inorganic fillers in the poly(meth)acrylimide film.

17. The poly(meth)acrylimide film according claim 3, wherein the content, in wt.-%, of the one or several impact modifiers $n_{im}$ in the poly(meth)acrylamide film is described by the following relationship:

$$0.6*n_f \leq n_{im} \leq 1.5*n_f \tag{5}$$

wherein $n_f$ is the content, in wt.-%, of the one or several inorganic fillers in the poly(meth)acrylimide film.

18. The poly(meth)acrylimide film according to claim 2, wherein the one or several inorganic fillers are selected from the group consisting of titanium dioxide, silica, zinc oxide, zinc sulphide, barium sulphate, carbon black, aluminium trihydroxide, and calcium carbonate.

19. The poly(meth)acrylimide film according to claim 3, wherein the one or several inorganic fillers are selected from the group consisting of titanium dioxide, silica, zinc oxide, zinc sulphide, barium sulphate, carbon black, aluminium trihydroxide, and calcium carbonate.

20. The poly(meth)acrylimide film according to claim 4, wherein the one or several inorganic fillers are selected from the group consisting of titanium dioxide, silica, zinc oxide, zinc sulphide, barium sulphate, carbon black, aluminium trihydroxide, and calcium carbonate.

21. The poly(meth)acrylimide film according to claim 1, wherein in the Formula (I), $R^1$ and $R^2$ are represented by a methyl group, and $R^3$ is a methyl group.

22. The forgery prevention label according to claim 8, wherein the layer consisting of the poly(meth)acrylimide film has a thickness of from 40.0 μm to 60.0 μm; wherein the adhesive layer has a thickness of from 20.0 μm to 30.0 μm; wherein the release coating layer has a thickness of from 0.6 μm to 0.8 μm; and wherein the support layer has a thickness of from 30.0 μm to 50.0 μm.

23. The laminate according to claim 9, wherein the liner layer has an initial tear resistance of from 50 N to 500 N, measured according to ASTM D1004 (2013) with a foil having a thickness of 50.0 μm.

24. The laminate according to claim 10, wherein the liner layer substantially contains a biaxially oriented polypropylene or a biaxially oriented polyethylene terephthalate.

25. The poly(meth)acrylamide film according to claim 1, wherein the poly(meth)acrylimide comprises at least 60 wt.-%, based on the weight of the poly(meth)acrylimide, of repeating units of Formula (I).

26. The poly(meth)acrylamide film according to claim 1, wherein the poly(meth)acrylimide comprises at least 70 wt.-%, based on the weight of the poly(meth)acrylimide, of repeating units of Formula (I).

27. The poly(meth)acrylamide film according to claim 6, wherein the poly(meth)acrylimide has an average molar weight Mw of from 90,000 g/mol to 150,000 g/mol determined by GPC using polymethyl methacrylate as a standard.

* * * * *